(12) United States Patent
McCall

(10) Patent No.: US 7,054,822 B2
(45) Date of Patent: May 30, 2006

(54) NOTIFICATION OF TIME-CRITICAL SITUATIONS OCCURRING AT DESTINATION FACILITIES

(75) Inventor: John E. McCall, West St. Paul, MN (US)

(73) Assignee: Ecolab, Inc., St. Paul, MN (US)

(*) Notice: Subject to any disclaimer, the term of this patent is extended or adjusted under 35 U.S.C. 154(b) by 147 days.

(21) Appl. No.: 09/923,200

(22) Filed: Aug. 6, 2001

(65) Prior Publication Data

US 2003/0033396 A1 Feb. 13, 2003

(51) Int. Cl.
*G06F 17/00* (2006.01)

(52) U.S. Cl. .............................. 705/1; 705/9
(58) Field of Classification Search .......... 705/1, 705/5, 6, 8, 9
See application file for complete search history.

(56) References Cited

U.S. PATENT DOCUMENTS

| | | | |
|---|---|---|---|
| 4,241,400 A | 12/1980 | Kiefer | |
| 4,404,639 A | 9/1983 | McGuire et al. | 364/551 |
| 4,482,785 A | 11/1984 | Finnegan et al. | |
| 4,509,543 A | 4/1985 | Livingston et al. | |
| 4,697,243 A | 9/1987 | Moore et al. | 364/513 |
| 4,707,848 A | 11/1987 | Durston et al. | 379/1 |
| 4,756,321 A | 7/1988 | Livingston et al. | |
| 4,837,811 A | 6/1989 | Butler et al. | 379/96 |
| 5,014,211 A | 5/1991 | Turner et al. | |
| 5,036,479 A | 7/1991 | Prednis et al. | 364/580 |
| 5,038,807 A | 8/1991 | Bailey et al. | |
| 5,043,860 A | 8/1991 | Koether et al. | |
| 5,136,281 A | 8/1992 | Bonaquist | |
| 5,203,366 A | 4/1993 | Czeck et al. | |
| 5,222,027 A | 6/1993 | Williams et al. | |
| 5,283,639 A | 2/1994 | Esch et al. | 348/6 |
| 5,345,379 A | 9/1994 | Brous et al. | |
| 5,400,018 A | 3/1995 | Scholl et al. | 340/825.54 |
| 5,584,025 A | 12/1996 | Keithley et al. | 395/615 |
| 5,619,183 A | 4/1997 | Ziegra et al. | 340/505 |
| 5,636,008 A | 6/1997 | LoBiondo et al. | 399/8 |
| 5,681,400 A | 10/1997 | Brady et al. | |
| 5,694,323 A | 12/1997 | Koropitzer et al. | |
| 5,695,091 A | 12/1997 | Winings et al. | |
| 5,724,261 A | 3/1998 | Denny et al. | |
| 5,745,381 A | 4/1998 | Tanaka et al. | |
| 5,757,664 A | 5/1998 | Rogers et al. | |
| 5,758,300 A | 5/1998 | Abe | 701/33 |

(Continued)

OTHER PUBLICATIONS

*We'd like to make a couple of things perfectly Clear*, Aquabalance Pool and Spa Management, Ecolab brochure, 1998 Ecolab Inc.

(Continued)

*Primary Examiner*—Thomas A. Dixon
(74) *Attorney, Agent, or Firm*—Merchant & Gould

(57) ABSTRACT

A network advisory system that provides advisory information to a field service provider and/or a management system is disclosed. The network advisory system receives collected data from one or more destination facilities and analyzes the information to generate advisory information. If the advisory information is deemed time-critical, the information is automatically transmitted to a management system to alert the system that a time-critical situation is resident at a destination facility. The management system may determine one or more appropriate field service providers to address the time-critical situation. If the advisory information is not deemed time-critical, the information may be stored by the network advisory system until access by a requesting entity—either a management system or a field service provider.

19 Claims, 9 Drawing Sheets

U.S. PATENT DOCUMENTS

| | | |
|---|---|---|
| 5,761,278 A | 6/1998 | Pickett et al. |
| 5,821,523 A | 10/1998 | Bunte et al. |
| 5,826,270 A * | 10/1998 | Rutkowski et al. ............ 707/10 |
| 5,826,749 A | 10/1998 | Howland et al. |
| 5,839,097 A | 11/1998 | Klausner |
| 5,861,881 A | 1/1999 | Freeman et al. |
| 5,864,783 A | 1/1999 | Struck et al. |
| 5,875,430 A | 2/1999 | Koether |
| 5,931,877 A | 8/1999 | Smith et al. |
| 5,933,479 A | 8/1999 | Michael et al. |
| 5,939,974 A | 8/1999 | Heagle et al. |
| 5,945,910 A | 8/1999 | Gorra |
| 5,956,487 A | 9/1999 | Venkatraman et al. |
| 5,961,561 A | 10/1999 | Wakefield, II |
| 5,967,202 A | 10/1999 | Mullen et al. |
| 5,973,696 A | 10/1999 | Agranat et al. |
| 5,975,352 A | 11/1999 | Spriggs et al. |
| 5,980,090 A | 11/1999 | Royal et al. |
| 6,003,070 A | 12/1999 | Frantz |
| 6,049,792 A | 4/2000 | Hart et al. |
| 6,061,668 A | 5/2000 | Sharrow |
| 6,073,124 A | 6/2000 | Krishnan et al. |
| 6,129,449 A | 10/2000 | McCain et al. |
| 6,321,204 B1 | 11/2001 | Kazami et al. |
| 6,330,499 B1 | 12/2001 | Chou et al. |
| 6,343,251 B1 | 1/2002 | Herron et al. |
| 6,356,205 B1 | 3/2002 | Salvo et al. |
| 6,357,292 B1 | 3/2002 | Schultz et al. |
| 6,377,868 B1 | 4/2002 | Gardner, Jr. |
| 6,418,371 B1 | 7/2002 | Arnold |
| 6,438,471 B1 | 8/2002 | Katagishi et al. |
| 6,490,513 B1 | 12/2002 | Fish et al. |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0096537 A1 | 7/2002 | Gardner, Jr. |

OTHER PUBLICATIONS

*White Paper, Ecolab Balancer. Com,* MRE Jun. 4, 1997.
*Relax. We've Got Your Pool Concerns Under Control,* Ecolab Water Care Services, 1998 Ecolab, Inc.

\* cited by examiner

NOTIFICATION OF TIME-CRITICAL SITUATIONS OCCURRING AT DESTINATION FACILITIES

CROSS REFERENCE TO RELATED APPLICATIONS

This application is related to subject matter disclosed in U.S. patent application for a METHOD AND SYSTEM FOR PRESENTING CUSTOMIZED ADVISORY INFORMATION, Ser. No. 09/923,176, and U.S. patent application for a METHOD AND SYSTEM FOR PROVIDING ADVISORY INFORMATION TO A FIELD SERVICE PROVIDER, Ser. No. 09/923,202, both of which are filed concurrently herewith, the subject matter of those applications is incorporated by reference in this application.

TECHNICAL FIELD

The invention relates generally to distributing information. More particularly, the invention relates to distributing advisory information to a management system.

BACKGROUND OF THE INVENTION

Generally, field service providers (e.g., a field service technician) are persons employed to provide a service at a destination facility. The field service provider is typically employed by a service providing company, but may also be a contractor or an internal employee of the facility operator. On any given day, a field service provider may visit multiple destination facilities while providing various different services at each destination facility.

Although a field service provider may visit multiple destination facilities on any given day, a particular destination facility may only receive a service visit on a scheduled routine basis. As such, a destination facility may go days, weeks, months, or even years between service visits by the field service provider. Regardless of the type of service to be provided and the destination facility to where a service is to be provided, unexpected situations may arise that require immediate attention by a field service provider. For example, an unexpected situation may be related to operational characteristics of a utility device, such as a warewasher, a laundry machine or any other conventional utility device. Illustrating one example, a particular component or module of a utility device may malfunction thereby rendering the utility device inoperable for its particular purpose. Hence, a substantial amount of revenue may be lost if the malfunction is not addressed within a relatively short period of time. Because field service providers typically address such services on a routine scheduled basis, it is likely that the repair will occur outside of this time period thereby resulting in at least a minimal loss of revenue.

SUMMARY OF THE INVENTION

In accordance with the present invention, the above and other problems are solved by the network advisory system (hereinafter "NAS"). Generally, the NAS provides advisory information to a management system of a service providing company to alert the management system that a service should be provided at a destination facility. A field service provider may be employed by the service providing company to provide the required service at the destination facility. As such, the destination location may be associated with either the service providing company or a customer of the service providing company employing the field service provider to provide service to the customer. The advisory information may take the form of scripts that are used by the management system to determine whether a particular service is required at the destination facility or whether a field service provider should receive training in a specialized area prior to providing the service.

The advisory information may be generated from data conclusions derived from collected data associated with a utility device at a destination facility. The utility device may be any machine, apparatus or system serviced by the field service provider. The utility device may be leased or purchased from the service providing company and therefore located at a destination location associated with the customer. The utility device may also be a device already owned by the customer at a time when the customer and the service providing company enter into an agreement for the service providing company to provide a service related to the device. Further, the utility device may also be the property of the service providing company at a destination location of the service providing company. Generally, the collected data includes device data associated with operating conditions of the utility device and account data associated with specific account and customer information. Account data may be broadly defined as all data not considered device data and may include, without limitation, business data related to invoice or financial information associated with the customer and/or utility device or census data related to an operational demand or supply associated with the utility device.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The great utility of the invention is that responsibilities of the service providing company may be prioritized or managed in such a way that time-critical situations may be addressed in relatively short time periods. Further, by receiving time-critical advisory information, a management system not only is given the ability to efficiently oversee operations of the service providing company, but benefits customers of the service providing company by providing the customers with a service that addresses unexpected, time-critical needs. These and various other features as well as advantages, which characterize the present invention, will be apparent from a reading of the following detailed description and a review of the associated drawings.

DETAILED DESCRIPTION OF THE EMBODIMENTS OF THE INVENTION

Figure 1:
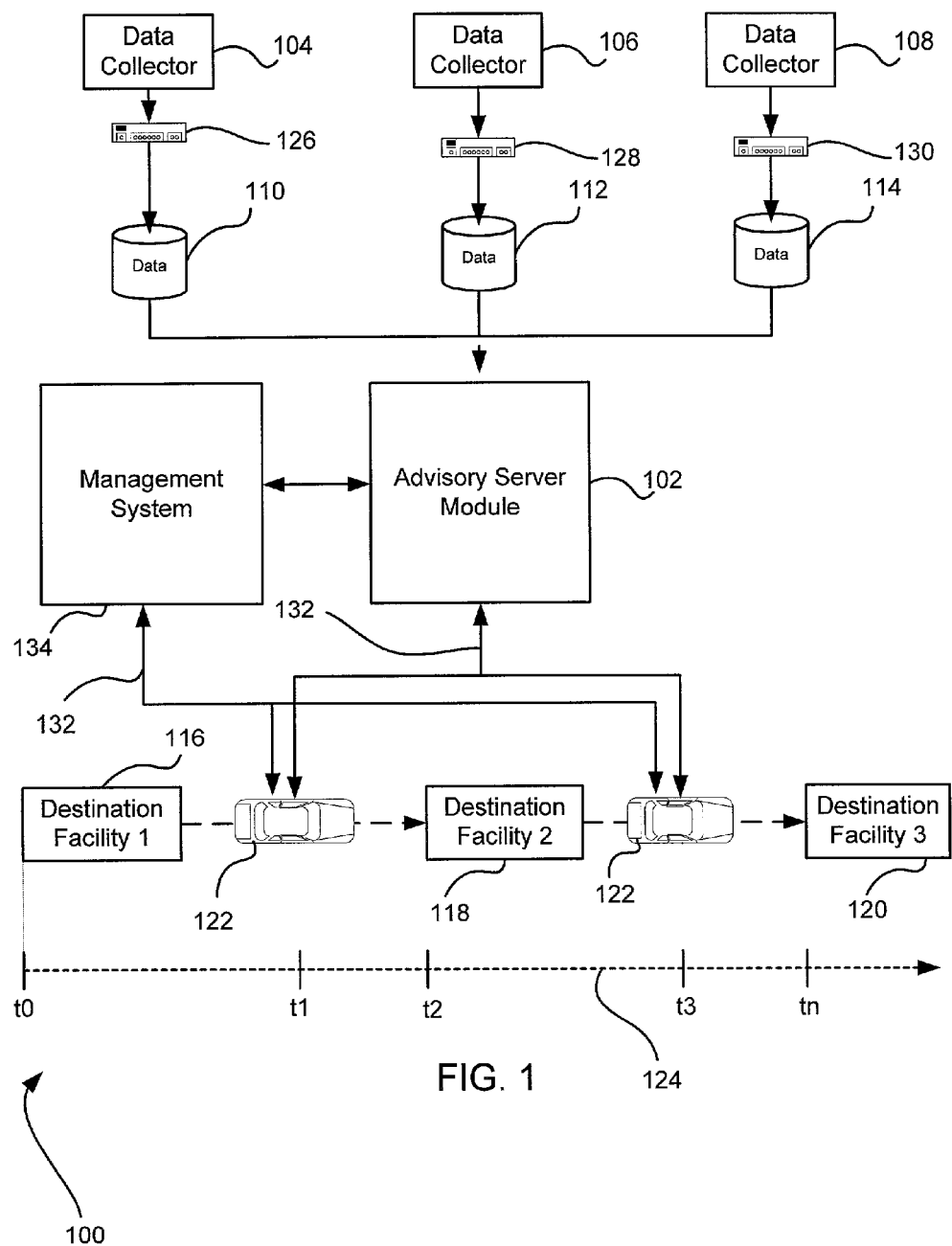
FIG. 1 is a functional diagram of a network advisory system in accordance with an embodiment of the present invention and the associated environment.

The present invention and its various embodiments are described in detail below with reference to the figures. When referring to the figures, like structures and elements shown throughout are indicated with like reference numerals.

Referring to FIG. 1, a conceptual illustration of an embodiment of the present invention is shown. FIG. 1 shows a network advisory system ("NAS") 100 that is responsible for collecting data associated with one or more destination facilities, i.e., 116, 118 and/or 120, and analyzing the data in order to provide management information to a management system 134 of a service providing company employed to provide a service at a destination facility, such as destination facilities 116, 118 and 120. Specifically, and in accordance with one embodiment, the management information provided to the management system 134 may be advisory information related to a service to be provided at one or more destination facilities, i.e., 116, 118 and/or 120. Advisory information may be information related to a destination facility, i.e., 116, 118 and 120, that relates collected data from the destination facility, i.e., 116, 118 and 120, to various advisory rules or conditions, i.e., criterion that advise the management system 134 of operating and status conditions associated with the destination facility, i.e., 116, 118 and 120, or a utility device located at the destination facility. As such, management information is described below, as an illustration and not a limitation, as advisory information.

The management system 134 may distribute the advisory information to one or more field service providers 122 if the advisory information identifies a time-critical situation at a destination facility, i.e., 116, 118 and 120. In accordance with an embodiment of the present invention, a time-critical situation may be a situation in need of immediate service by a field service provider 122. A time-critical situation may also be a situation that should be addressed by a field service provider 122 within a predetermined time interval in the future prior to routine service at the destination facility, i.e., 116, 118 and 120 experiencing the situation. As such, the time-critical situation may or may not be a situation that must be immediately addressed by a field service provider 122. A field service provider 122 addresses a situation, whether time-critical or non time-critical, by providing a service at a destination facility in response to a time-critical or non time-critical situation at the destination facility, i.e., 116, 118 and 120. As such, a field service provider 122 may address a non-time critical situation during routine service visits to a destination facility, i.e., 116, 118 and 120.

If advisory information identifies a time-critical situation at a destination facility, i.e., 116, 118 and 120, the management system 134 is alerted that service is needed at the destination facility other than a routine scheduled service, regardless of whether the routine scheduled service is hourly, daily, weekly or monthly. By immediately contacting one or more field service providers 122, the management system 134 may address the time-critical situation prior to substantial loss of revenue. In contrast, a non time-critical is a situation which is not in need of immediate service by a field service provider 122 and therefore only requires a routine scheduled service, whether hourly, daily, monthly or annually. Whereas advisory information related to a time-critical situation at a destination facility, i.e., 116, 118 and 120, may hereafter be referred to as "time-critical advisory information," advisory information related to a non time-critical situation at a destination facility may hereafter be referred to as "non time-critical advisory information."

In accordance with an embodiment of the present invention, the management system 134 may be any system, device, machine or computing module as well as a person or group of persons, such as, without limitation, higher-level employees/employers and managers. For purposes of clarity and by way of illustration and not limitation, the management system 134 is hereafter described as a computer module receiving advisory information related to a time-critical situation at a destination facility, i.e., 116, 118 and 120, and immediately contacting a field service provider 122 to address the time-critical situation.

As a means of illustration and not limitation, a field service provider 122 is shown in FIG. 1 as a person traveling between destination facilities, i.e., 116, 118 and 120; however, the field service provider 122 may be any system, device, or computer module capable of providing a service to a destination facility, i.e. 116, 118 and 120. As mentioned, the field service provider 122 may be employed by a service providing company to provide any service, whether time-critical or non time-critical, at the destination facility 116, 118 or 120. As such, the destination facility 116, 118 or 120 may be associated with either the service providing company or a customer of the service providing company employing the field service provider 122 to provide service to the customer.

The advisory information may take the form of scripts that may be used both by the management system 134 and the field service provider 122. Whereas the scripts may be presented to the management system 134 to alert the system 134 that a time-critical situation has developed at a destination facility, i.e. 116, 118 or 120, the scripts may be presented to a field service provider 122 to either provide a particular service at the destination facility 116, 118 or 120 or receive training in a specialized area of which the field service provider 122 requests or requires instruction. The scripts, which may be presented to the field service provider 122 in a binary, textual, audio and/or visual format, may be time-critical related and thus distributed by the management system 134 or the NAS 100 upon instruction by the management system 124. The scripts may also be non time-critical related and thus distributed by the NAS 100 as the field service provider 122 accesses the system 100 and requests the script(s).

In accordance with an embodiment where the management system 134 is a computing module, the scripts are formatted in a computer-based language which may be interpreted by the computing module. In accordance with an embodiment where the management system 134 is a person, the scripts may be formatted in one or more natural languages used by the people included in the management system 134. Because the management system 134 is hereafter described as a computing module, the scripts provided to the management system 134 are hereafter described as formatted in a computer-based language.

The service provided is described below as device and account maintenance related to the rental/leasing of a utility device, such as, without limitation, a ware washer, a vending machine, a laundry machine, or any type of farm equipment, medical equipment, computer equipment, vehicular service equipment or office equipment. However, it should be appreciated that the present invention encompasses any type of service to which a field service provider 122 may be employed to carry out the duties of the service, including, without limitation, upgrades, replacement, training, restocking, pest elimination, medical exams, and lawn care.

In an embodiment of the present invention, the NAS 100 is a computer network operated by an advisory module 102. The advisory module 102 comprises a server computer that receives data from data collectors, such as data collectors 104, 106 and 108. Even though the NAS 100 is shown having only three data collectors 104, 106 and 108, the NAS 100 may be implemented using any number of data collectors. Data collected by the data collectors 104, 106 and 108 is uploaded by one or more data transmitters, such as data transmitters 126, 128 and 130, to one or more databases, such as databases 110, 112 and 114, accessible to the advisory module 102. The collected data is then stored in the one or more databases, i.e., 104, 106 and/or 108, for a predetermined period of time. The advisory module 102 receives data from data collectors, i.e., 104, 106 and/or 108 and generates advisory information. As mentioned, the advisory information may be either time-critical or non time-critical. If the information is non time-critical, the advisory information may be provided to a field service provider from the advisory module 102 as the field service provider 122 accesses the advisory module 102 and requests such advisory information. If, however, the advisory information is time-critical, the advisory information is presented to a management system 134 in accordance with one embodiment of the present invention. The management system 134 may then determine the appropriate field service providers 122 that are to receive the time-critical advisory information and either distribute the advisory information to the appropriate field service providers 122 directly or instruct the advisory module 102 to administer the distribution.

The NAS 100 may be implemented with the data collectors 104, 106 and 108 and the data transmitters 126, 128 and 130 located at a specific destination facility 116, 118 or 120. The destination facility 116, 118 and 120 may be associated with a service providing company employing the field service provider 122 or a customer to the service providing company. A destination facility, i.e., 116, 118 or 120, is defined not based on where the customer or service providing company regularly conduct business, but instead as the location at which the service is to be provided to the customer. As an example and not a means of limitation, a customer's destination facility, i.e., 116, 118 and 120, is hereafter defined as the location where a utility device is located.

In accordance with a first embodiment, the field service provider 122 may be employed by a service providing company and the service providing company may be employed to provide service to a utility device at one or more destination facilities, i.e., 116, 118 and/or 120, associated with a first customer. As such, the service providing company employs the field service provider 122 as an agent to provide the specified service. The service providing company includes a management system 134 responsible for overseeing the duties and responsibilities of each field service provider 122. Thus, the management system 134 may be considered a higher-level employee of the service providing company and the field service providers 122 may be considered lower-level employees receiving direction from and being assigned duties by the management system 134. As such, by distributing advisory information related to a time-critical situation to field service providers 122, the management system 134 may direct one or more field service providers 122 to address the time-critical situation at the appropriate destination facility, i.e., 116, 118 and 120. As described above, the management system 134 may be any system, device, machine or computing module as well as a person or group of persons, such as, without limitation, higher-level employees/employers and managers. However, for purposes of clarity and by way of illustration and not limitation, the management system 134 is hereafter described as a computer module receiving advisory information related to a time-critical situation at a destination facility and immediately contacting a field service provider 122 to address the time-critical situation.

The data collectors 104, 106 and 108, the data transmitters 126, 128 and 130, and the databases 110, 112 and 114 may be located at either a destination facility, i.e., 116, 118 and 120 associated with a customer or a central location associated with the service providing company. As described below, the data collectors 104, 106 and 108 collect various forms of data including, without limitation, device data and account data. Whereas data collectors 104, 106 and 108 and data transmitters 126, 128 and 130 associated with device data are typically located at a destination facility, i.e., 116, 118 and 120, data collectors 104, 106 and 108 associated with account data are typically located in a central location associated with the service providing company. The field service provider 122 may be provided advisory information either from the management system 134 or the advisory module 102 while in transit to the destination facility, as shown in FIG. 1. in accordance with an embodiment of the present invention. Alternatively, the field service provider 122 may be provided such advisory information while located at the destination facility 116, 118 or 120 or any other stationary location.

In accordance with a second embodiment, the field service provider 122 may be employed by a service providing company to provide service to a utility device at one or more destination facilities, i.e., 116, 118 and/or 120 associated with the service providing company. As such, the service providing company employs the field service provider 122 as an employee to provide the specified service. The service providing company includes a management system 134 responsible for overseeing the duties and responsibilities of each field service provider 122. Thus, the management system 134 may be considered a higher-level employee of the service providing company and the field service providers 122 may be considered lower-level employees receiving direction from and being assigned duties by the management system 134. As such, by distributing advisory information related to a time-critical situation to field service providers, the management system 134 may direct one or more field service providers to address the time-critical situation at the appropriate destination facility. As also described with the first embodiment, the management system 134 may be any system, device, machine or computing module as well as a person or group of persons, such as, without limitation, higher-level employees/employers and managers. However, for purposes of clarity and by way of illustration and not limitation, the management system 134 is hereafter described as a computer module receiving advisory information related to a time-critical situation at a destination facility and immediately contacting one or more appropriate field service providers 122 to address the time-critical situation.

The data collectors 104, 106 and 108, the data transmitters 126, 128 and 130, and the databases 110, 112 and 114 may be located at either the destination facility 116, 118 or 120 or a central location associated with the service providing company. Further, the field service provider 122 may be provided advisory information from either the management system 134 or the advisory module 102 while in transit to the destination facility 116, 118 or 120, as shown in FIG. 1 in accordance with an embodiment of the present invention. Alternatively, the field service provider 122 may be provided such advisory information while located at the destination facility 116, 118 or 120 or any other stationary location. The field service provider 122 may also be an independent contractor hired to provide a specified service at a destination facility, i.e., 116, 118 or 120. As such, the field service provider 122 may be hired by either a service providing company or a customer to a service providing company.

As described, the utility device may be located at the destination facility 116, 118 or 120 and may be associated with the service providing company or a customer of the service providing company receiving the service. As such, the customer may have purchased or leased the utility device from the service providing company. Alternatively, the utility device may be a device already owned by the customer at a time when an agreement to service the device is executed between the service providing company and the customer.

The advisory module 102 receives data from the one or more databases 110, 112 and/or 114 storing the collected data and analyzes the data to produce advisory information. As mentioned, the advisory information may take the form of scripts provided to the management system 134 and the field service provider 122. Further, the scripts may be customized messages formatted in language (natural and computer-based) and/or content to the management system 134, the field service provider 122 and/or the destination facility, i.e., 116, 118 and 120, where a service is to be provided. The advisory information may also take the form of hard data, such as the data collected by data collectors 104, 106 and 108.

In accordance with one embodiment, the advisory module 102 and the management system 134 may provide advisory information—time-critical and non time-critical—to a field service provider 122 as the field service provider 122 is in transit to a destination facility, i.e., 116, 118 or 120. As such, the field service provider 122 may be in transit between two destination facilities, i.e., 116, 118 and/or 120, as shown in FIG. 1. An illustration of the field service provider 122 being in transit is shown with reference to a time line 124. For example, in FIG. 1, the field service provider 122 is shown in transit between the first destination facility 116 and the second destination facility 118 at time $t_1$. Likewise, the field service provider 122 is shown in transit between the second destination facility 118 and the third destination facility 120 at time $t_3$. The time that the field service provider 122 is in transit between destination facilities, i.e., 116, 118 and/or 120, is commonly referred to as "windshield time." By providing the field service provider 122 with advisory information during a windshield time, the field service provider 122 can receive information related to the next service to be provided at the next destination facility 116, 118 or 120 that the field service provider is to visit at a time that is relatively cost and time efficient. Furthermore, with respect to time-critical advisory information, by presenting the advisory information to the field service provider 122 during windshield time, the information may be immediately provided to the field service provider 122. In accordance with a second embodiment, the advisory module 102 may provide advisory information to the field service provider 122 while the field service provider 122 is located at a destination facility, i.e., 116, 118 or 120. At any rate, if the advisory information is time-critical, the field service provider 122 may be immediately contacted by either the management system 134 or the advisory module 102 not only at a destination facility, i.e., 116, 118 or 120 or while in transit between facilities, but also at any other location where the field service provider 122 is accessible to wireless or land-based communications. As such, the field service provider 122 may be contacted by the management system 134 or the advisory module 102 via telephone—wireless or land-based—pager, computer, radio, or any other device allowing the reception of data over a communication network 132.

Although FIG. 1 only depicts a first destination facility 116, a second destination facility 118 and a third destination facility 120, the NAS 100 may be used to provide advisory information to the management system 134 and a field service provider 122 as the service providing company employs a field service provider 122 to provide scheduled routine service at any number of destination facilities over a given time period. As such, FIG. 1 shows a time line 124 depicting specific times that illustrate the location of the field service provider 122 over a given period of time of the scheduled routine service. For instance, at time $t_0$, the field service provider 122 would be providing a service at the first destination facility 116. At time $t_1$, the field service provider 122 is in transit between the first destination facility 116 and the second destination facility 118. Likewise, at time $t_2$, the field service provider 122 would be providing a service at the second destination facility 118. The time line 124 is therefore a continuous timeline beginning at time $t_0$ and ending at a time $t_N$, which would be the final destination facility 120, visited by the field service provider 122 during a particular time period (shown in FIG. 1 as times $t_0$–$t_N$) during which the field service provider 122 is providing various services to multiple destination facilities, i.e., 116, 118 and/or 120. Accordingly, in FIG., 1 time $t_N$ represents the time that the field service provider 122 reaches the third destination facility 120. In accordance with an embodiment, if a time-critical situation arises, the field service provider 122 may be contacted and immediately presented the time-critical advisory information at any time on the time line 124.

The data collectors 104, 106 and 108 may collect any type of data that is useful to the field service provider 122 as the field service provider 122 is preparing to provide or currently providing a service at a destination facility, i.e., 116,

118 and 120. For example, but not by way of limitation, the data collectors 104, 106 and 108 may collect device data or account data related to a particular customer associated with a destination facility, i.e., 116, 118 or 120. Device data may be broadly defined as data associated with a utility device at a destination facility. Account data may be broadly defined as all data not considered device data and may include, without limitation, business data related to specific account, invoice or financial information associated with a customer and/or utility device and census data related to a specific demand or supply associated with a customer and/or utility device. As an illustration, device and account data is described below as data related to a utility device, such as, without limitation, a ware washer, a vending machine, a laundry machine, a chemical dispenser, or any type of office equipment, farm equipment, medical equipment, lawn/garden equipment, vehicular service equipment, computer and computer-related equipment, software, or security equipment. However, the data, particularly account data, may be related to any type of service of which a field service provider 122 may be employed to carry out duties of the service.

In accordance with an embodiment, device data is data that relates to operations of a particular utility device that the field service provider 122 may service at a destination facility, i.e., 116, 118 and 120. In particular, device data relates to parameters and operating conditions of the utility device located at a particular destination facility, i.e., 116, 118 and 120. Using a conventional vending machine as an example of a utility device from which device data is taken, the device data may relate to the temperature inside the cooler of the vending machine.

As noted above, account data may include, without limitation, business data and census data. In accordance with an embodiment, business data is data that generally relates to customer account information specific to a particular customer account. For instance, specific account information may identify a particular time period during which a customer has retained the services of the service providing company in servicing a particular utility device. Business data may also include invoice or financial information associated with a particular customer account. Invoice information may be information relating to a past due amount owed by a customer on an account, the current account balance of a customer's account, or any other information relating to financial or credit information associated with a specific customer. Using a conventional vending machine as an example of a utility device stored at a destination facility associated with a customer and subject to servicing by the field service provider 122, business data may include data that shows the customer's balance on the lease of the vending machine is thirty days past due.

In accordance with an embodiment, census data generally relates to a demand or supply associated with a particular service. As such, many specific samples of collected data may fall under the definition of "device" data. For instance, using a conventional vending machine as an example of a utility device stored at a customer's destination facility, i.e., 116, 118 and 120, and subject to servicing by the field service provider 122 in both time-critical and non time-critical situations, census and device data may both relate to information associated with the quantity of a particular product that is sold through the vending machine during a specified time period. Likewise, if the utility device serviced by the field service provider 122 is a laundry machine, census and device data may both illustrate the amount of laundry detergent used by the customer over a specified time period. For reasons of example and not limitation, any type of data related to a supply or demand associated with a utility device is hereafter described as census data and any type of data related to actual structures (electrical, mechanical, etc.) or operating conditions (water temperature, revolutions per minute, etc.) of a utility device is hereafter described as device data.

In accordance with a first embodiment, the data collectors 104, 106 and 108 collect various types of data from a single destination facility 116, 118 and 120. For instance, the first data collector 104 may collect device data related to a vending machine located at the first destination facility 116 and the second data collector 106 may collect business data related to rental of the vending machine at the first destination facility 116. In accordance with a second embodiment, the data collectors 104, 106 and 108 may collect data specific to separate destination facilities, i.e., 116, 118 and/or 120. For instance, the first data collector 104 may collect data specific to the first destination facility 116, the second data collector 106 may collect data specific to the second destination facility 118 and the third data collector 108 may collect data specific to the third destination facility 120.

Regardless of which embodiment is employed, data is collected from the data collectors 104, 106 and 108 and provided to the advisory module 102 via data transmitters 124, 126 and 128. The data transmitters 124, 126 and 128 are responsible for uploading data collected by the data collectors 104, 106 and 108 to one or more databases, such as databases 110, 112 and 114 accessible to the advisory module 102. The location of the databases 110, 112 and 114 is immaterial so long as the databases 110, 112 and 114 are accessible to the advisory module 102. Further, the databases 110, 112 and 114 may be replaced by, or part of, a single master database 208, as shown and described in FIG. 2. The advisory module 102 retrieves data stored in the one or more databases 110, 112 and/or 114 and uses the data to generate advisory information.

After a sample of data is received, the advisory module 102 analyzes the data to generate a data conclusion. Data conclusions are independent conclusions or determinations derived from an analysis and/or manipulations of the collected data against advisory rules associated with a particular data type of the sample of data. The data type is generally defined by the form or subject matter (i.e., device, business, census, etc.) of the data and more specifically defined by the source from where the data originates. Indeed, data type may be identified in general as device or account data, more specifically as device, census or business data, and even more specifically as sub-data types of device, census or business data. As such, in pairing collected data to an advisory rule to analyze the data against the rule to generate a data conclusion associated with the data, a general data type and a specific data type of the data are used to match the data to the appropriate advisory rule. For instance, data taken from a conventional laundry machine may be generally identified as device data and specifically identified as relating to the water temperature of the wash cycles. As such, the specific data type is associated with water temperature of a wash cycle and used in determining which advisory rule the data is to be analyzed against.

Each advisory rule includes at least one advisory condition to which collected samples of data are analyzed against. The advisory conditions are used to compare collected samples of data to operating and/or threshold parameters associated with the data type of the data being manipulated. Once derived, the data conclusions are thereafter analyzed to determine whether a time-critical situation has developed with respect to the destination facility, i.e., 116, 118 and 120. As such, if a data conclusion associated with a general and specific data type is within a range considered by the advisory module 102 as "time-critical," then the conclusion is mapped to specific advisory information relating the conclusion to the management system 134. The time-critical advisory information is then presented to the management system 134 alerting the system 134 of the time-critical situation. The management system 134 then analyzes the time-critical advisory information to determine one or more field service providers 122 that may be used to address the time-critical situation within a relatively short time period. Once the appropriate field service providers 122 are determined, the management system 134 will either present the time-critical advisory information directly to the field service provider 122 or will instruct the advisory module 102 to administer the presentation.

If a data conclusion is not associated with a time-critical situation, the conclusion is then mapped to specific advisory information capable of relating the conclusions to the field service provider 122 in a manner such that the field service provider 122 may use the collected data to provide a particular service at a destination facility, i.e., 116, 118 and 120, based on the advisory information. As mentioned, the advisory information may take the form of scripts that are used by the field service provider 122 to either provide a particular service at the destination facility 116, 118 or 120 or receive training in a specialized area of which the field service provider 122 requests or requires instruction.

Regardless of whether advisory information is time-critical or non time-critical, advisory information may be customized based on content of the advisory information and language of the field service provider. For instance, the advisory information may be customized to the particular destination facility 116, 118 or 120 and the particular field service provider 122 providing the service at the facility 116, 118 or 120. Furthermore, the advisory information generated by the advisory module 102 may also be customized to the language of the field service provider 122. As mentioned, the advisory information may be associated with business, census or device information related to providing a specific service to a specific customer associated with the destination facility 116, 118 or 120. The advisory information may also be associated with training or instruction information requested or required by the field service provider 122. Such training or instruction may or may not be related to any particular customer.

The operations used in accessing the advisory information are described in more detailed below in FIGS. 3 and 9. By customization, the advisory information may be formatted not only on the customer associated with the destination facility 116, 118 or 120 and the field service provider 122 providing the service to the customer, but also the subject matter of the service to be provided by the field service provider 122. The subject matter, or content, of the service relates to the general type of data that the advisory information is associated with. For instance, if the advisory information is generated from data related to a vending machine, the subject matter of the advisory information may be related to either device data, census data or business data. As an example, advisory information may specify that a product in a vending machine at the first destination facility 116 needs immediate replenishing. Accordingly, time-critical advisory information may relate this situation to the management system 134. The management system 134 may then forward the advisory information to an appropriate particular field service provider 122, i.e., a field service provider trained to replenish vending machines. As another example, if the subject matter of the advisory information relates to business data, then the objective of the service may be to collect a past due amount from a customer of the destination facility, i.e., 116, 118 and 120. In such a case, the advisory information may relate a balance of the past due amount to the either the management system 134 (if time-critical) and/or field service provider 122 (if time or non time-critical).

Figure 2:
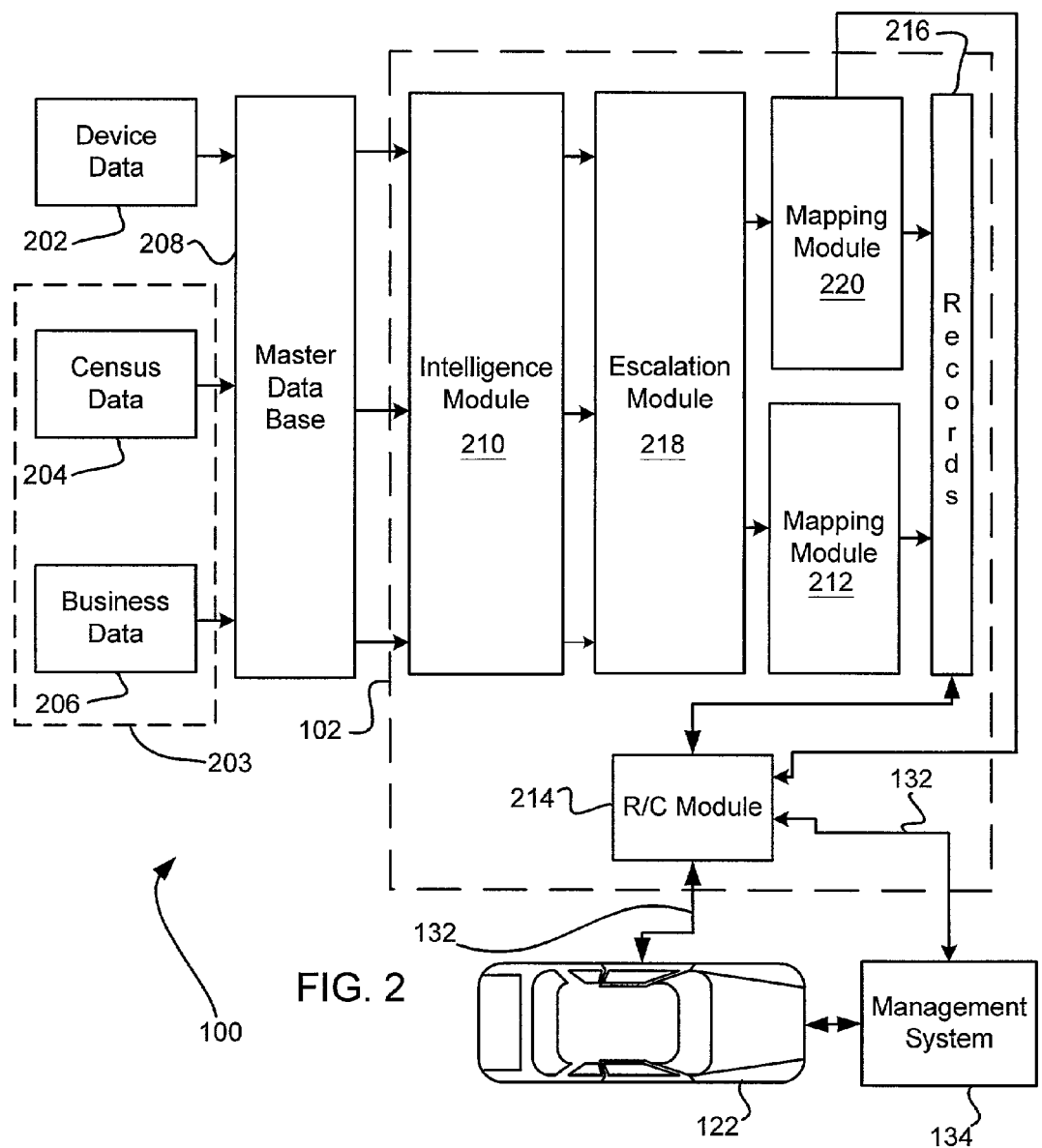
FIG. 2 is a simplified block diagram that illustrates functional components of a network advisory system such as the network advisory system in FIG. 1, in accordance with an embodiment of the present invention.

Referring now to FIG. 2, an illustration of the NAS 100 incorporating data from a destination facility, i.e., 116, 118 and 120, associated with a single customer employing a service providing company to provide a service is shown in accordance with an embodiment of the present invention. As an example to illustrate the NAS 100, as shown in FIG. 2 and not by way of limitation, the customer is provided a service at the destination facility, i.e., 116, 118 and 120, by a field service provider 122 under employment of the service providing company. The service may be either a time-critical or a non time-critical service. The NAS 100 compiles and stores device data 202 and account data 203 including, without limitation, census data 204 and business data 206, in a master database 208. In a first embodiment, the master database 208 contains separate records for storing the separate types of data, i.e., the device data 202, the census data 204 and the business data 208. In a second embodiment, the master database 208 may be replaced by, or include multiple databases, such as the databases 110, 112 and 114 shown in FIG. 1, with each database storing a separate type of data. As such, a device data database may store the device data 202, a census data database may store the census data 204 and a business data database may store the business data 206.

The data 202, 204 and 206 are collected from data collectors, such as data collectors 104, 106 and 108. The data collectors 104, 106 and 108 may be located at the destination facility, i.e., 116, 118 and 120. Alternatively, the data collectors 104, 106 and 108 may be located at a central location of the service providing company. Thus, as an example to illustrate the present invention and not a limitation, FIG. 2 is described with reference to a field service provider 122 providing a service, either time-critical or non time-critical, to a leased utility device located at a customer's destination facility, i.e., 116, 118 and 120. More particularly, the leased utility device in this example is an industrial laundry machine. As such, device data 202 from the laundry machine is illustrated in FIG. 2 as relating to the water level of water in a wash basket of the laundry machine; census data 204 is illustrated in FIG. 2 as relating to the amount of laundry detergent used by the customer over a specified period of time; and business data 206 is illustrated in FIG. 2 as relating to invoice information concerning the lease of the laundry machine.

Device data 202, census data 204 and business data 206 are received into the master database 208 and stored in the database 208 until such time that the data are to be analyzed by the advisory module 102. In accordance with an embodiment of the invention, the advisory module 102 is constructed with an intelligence module 210, an escalation module 218, a time-critical mapping module 220 and a standard, or non time-critical, mapping module 212. The intelligence module 210 formulates the device data 202, the census data 204 and the business data 206 into data conclusions by analyzing the data against advisory rules. The escalation module 218 analyzes the data conclusions generated by the intelligence module 210 to determine whether the conclusions relate to a time-critical situation. If a conclusion relates to a time-critical situation, the conclusion is passed to the time-critical mapping module 220 and the conclusion is mapped to advisory information prior to being presented to a management system 134. If a conclusion relates to a non time-critical situation, the conclusion is passed to the standard mapping module 212 and the conclusion is mapped to advisory information prior to being stored in a storage module 216, where it may subsequently be accessed by a field service provider 122 and the management system 134.

As mentioned above, data conclusions are independent conclusions or determinations derived from the collected data. The data conclusions are derived based on the data type of the collected data, i.e., whether the data is device, account, or census data. As such, the data conclusions are determined based on an analysis against an advisory rule associated with each general and specific data type. As noted above, each advisory rule includes at least one advisory condition and each advisory condition relates the collected sample of data to one or more operating and/or threshold parameters. For example, if the device data 202 shows that the initial water level in the wash basket is 5 gallons, the intelligence module 210 may compare this initial water level in the wash basket to a water level range of 4.0 to 6.0 gallons to conclude that the initial water level in the wash basket is within normal operating limits associated with the laundry machine. Likewise, if the census data 204 shows that the customer has used 1000 packages of laundry detergent within a one month time period, the intelligence module 210 may compare this quantity of use to a quantity of 800 packages to conclude that the customer requires a greater quantity of laundry detergent for the next months supply.

Table 1, which further illustrates the device data example of FIG. 2, shows a listing of data conclusions generated by the intelligence module 210 along with the advisory conditions used in generating each conclusion. The variable "X" represents the initial water level in the wash basket taken at time $T_i$ and the variable "Y" represents the mid-cycle water level in the wash basket taken at time $T_{MC}$. Both "X" and "Y" are measurements of water level in gallons.

TABLE 1

| Factor | Data Conclusion |
|---|---|
| If $X \leq 4.0$ | 00 |
| If $4.0 < X < 6.0$ | 01 |
| If $X \geq 6.0$ | 02 |
| If $Y \leq 4.0$ | 03 |
| If $4.0 < Y < 6.0$ | 04 |
| If $Y \geq 6.0$ | 05 |

Once generated by the intelligence module 210, the data conclusions are analyzed by the escalation module 218 to determine whether a data conclusion identifies a time-critical situation at a destination facility, i.e. 116, 118 and 120. In accordance with one embodiment, specific data conclusions per data type are recognized by the escalation module 118 as identifying a time-critical situation. As such, each data conclusion generated by the intelligence module 210 is compared to escalation rules associated with the general and specific data type of the conclusion to determine whether the conclusion relates to a time-critical situation. For example, an escalation rule for device data used in the illustration of Table 1 may specify that a "00" data conclusion associated with device data of a laundry machine identifies a time-critical situation related to the laundry machine in that a potential leak is resident in the wash basket.

If a time-critical situation is identified by the escalation module 218, the data conclusion associated with the time-critical situation is mapped to advisory information by time-critical mapping module 220. If a time-critical situation is not identified by the escalation module 218, the data conclusion associated with the non time-critical situation is mapped by the mapping module 212 to advisory information. Regardless of whether the conclusion is mapped by time-critical mapping module 220 or standard mapping module 212, the advisory information may take the form of a specific script illustrative of the data type of each data conclusion. As such, the advisory information is hereinafter described in conjunction with FIG. 2 as a script. A script is a predefined textual, binary, audio and/or visual message that relates the data conclusion to a format recognizable to the field service provider 122 and/or the management system 134. Thus, the script may be formatted to a natural or computer-based language, depending on whether the field service provider 122 and/or the management module 134 are computing modules or people.

Each data conclusion is associated with one or more particular scripts recognized by either the standard mapping module 212 or the time-critical mapping module 220. Table 2, which further illustrates the device data example of FIG. 2, shows a mapping of scripts to the data conclusions shown in Table 1. The scripts in Table 2 are illustrated as being either audio or textual. In accordance with the embodiment, audio scripts may be predefined .WAV files. Likewise, textual scripts may be formatted in a conventional character set.

Although Table 2 only depicts audio or textual scripts mapped to data conclusions, it should be appreciated that the scripts may be binary or audio/visual. The audio/visual scripts may include frames in Moving Picture Experts Group (MPEG) standards format or some variation thereof. Indeed, audio/visual scripts are particularly beneficial under circumstances where the management system 134 and/or the field service provider 122 communicate with the NAS 100 through the Internet or a personal assistant (PDA) having visual capabilities. Furthermore, the scripts in Table 2 are shown as a single phrases for simplicity of this example. Generally, however, a script comprises textual, binary, audio and/or visual messages having multiple phases or frames.

TABLE 2

| Data Conclusion | Scripts |
|---|---|
| 00 | "The initial water level in the wash basket is below the normal range. The wash basket has a potential leak." |
| 01 | "The initial water level in the wash basket is within the normal range." |
| 02 | "The initial water level in the wash basket is above the normal range." |
| 03 | "The mid-cycle water level in the wash basket is below the normal range. The wash basket has a potential leak." |
| 04 | "The mid-cycle water level in the wash basket is within the normal range." |
| 05 | "The mid-cycle water level in the wash basket is above the normal range." |

In accordance with one embodiment, the scripts mapped by the standard mapping module 212 may be transmitted from the module 212 to a storage module 216, whereas the scripts mapped by the time-critical mapping module 220 may be transmitted from the module 220 directly to the management system 134. In accordance with another embodiment, the scripts mapped by the time-critical mapping module 220 are not only transmitted from the module 220 directly to the management system 134, but a copy of the scripts are transmitted to the storage module 216. The storage module 216 may be a timed-buffer or FIFO containing a predetermined number of records based on the number of customers of the service providing company and the number of accounts held by each customer. Because the storage module 216 is a timed-buffer, records in the storage module 216 are continuously erased as new data is collected and conclusions are generated and mapped to scripts by the advisory module 102. As such, the records may be written over with new data every 24 hours. In accordance with other embodiments, the time period of which the scripts are stored in the records may be any given length of time. This length of time is generally dependent upon the type of service sought by the customer and the frequency to which that service is to be provided. Alternatively (see FIG. 6), the scripts may be transmitted from the standard mapping module 212 directly to field service providers 122 without passing through a storage module 216, which in this instance would store the associated data conclusions.

In an embodiment of the present invention, a field service provider 122 may access the NAS 100 by connecting to a registration/communication ("R/C") module 214 through a network connection 132. The field service provider 122 may connect to and access the NAS 100 through any type of network, or communication, device or module including, without limitation, a cellular telephone, a personal digital assistant (PDA), a laptop computer, a desktop computer, a land-line based telephone, a kiosk or any other network device that allows a user to communicate with the advisory module 102 while connected through the network connection 132. As noted, the network connection 132 may be either a land-based connection or a wireless connection. Additionally, the network connection may be a combination of a land-based and a wireless connection, such as the case where a wireless PDA connects to an Internet service provider (ISP) which is connected via a land-based connection to the NAS 100. Furthermore, in instances where a time-critical situation is identified by the escalation module 218, a field service provider 122 may be contacted by the NAS 100 based on a determination by the management system 134. As such, the field service provider 122 may not initiate access to the NAS, but rather the management system 134, or the advisory module 102 under direction of the management system 134, may initiate contact with the field service provider 122 through the a network connection 132 as described above. Hence, the field service provider 122 may use the network device to receive time-critical advisory information from either the management system 134 or the advisory module 102 via the R/C module 214.

With respect to time-critical advisory information, the transmittal of a particular script by the advisory module 102 to a management system 134 may be automatically administered without request by the management system 134 if the escalation module 218 determines that a conclusion relates to a time-critical situation. As such, the scripts may be transmitted directly from the time-critical mapping module 220 to the management system 134 via the R/C module 214. The management station 134 is then responsible for transmitting the script to one or more appropriate field service providers 122. As described above, a copy of the time-critical scripts may be stored in the storage module 216 such that the scripts may be available to either the management system 134 or a field service provider 122 upon access to the NAS 100. To retrieve a time-critical script stored in the storage module 216, a user of the NAS 100, e.g., either a management system 134 or a field service provider 122 communicating with the NAS 100, inputs an identification code 302 and a customer account code 304 as described below with FIG. 3.

To access the NAS 100, a field service provider 122 and the management system 134 input information to communicate with the advisory module 102 through a human interface device or module using the network device. The human interface module may be any number of interface modules based on the network device through which the field service provider 122 is connected to the network connection 132. By way of illustration and not limitation, in cases where the network device is a computer (laptop or desktop), the human interface module may be a keyboard, a mouse, a joystick, a touch screen or any other similar user interface device operably connected to the computer and capable of transmitting and receiving information to and from a network server or remote computer.

Once a field service provider 122 or the management system 134 is identified by the R/C module 214, the module 214 transmits the appropriate scripts to be provided to the field service provider 122 or the management system 134 based upon authentication and identification information input by the requesting entity—either the management system 134 or a field service provider 122. As mentioned, the data type of the script(s) may be categorized as device data 202, census data 204 or business data 206. Once the customer account and data type is determined, appropriate scripts are retrieved from the storage module 216 and transmitted to the field service provider 122 over the network connection 132. As shown in FIG. 1 at times $t_1$ and $t_3$, the field service provider 122 may access the NAS 100 while in transit between destination facilities, i.e., 116, 118 and/or 120. Alternatively, the field service provider 122 may access the NAS 100 as the field service provider 122 is located at a customer's destination facility.

Figure 3:
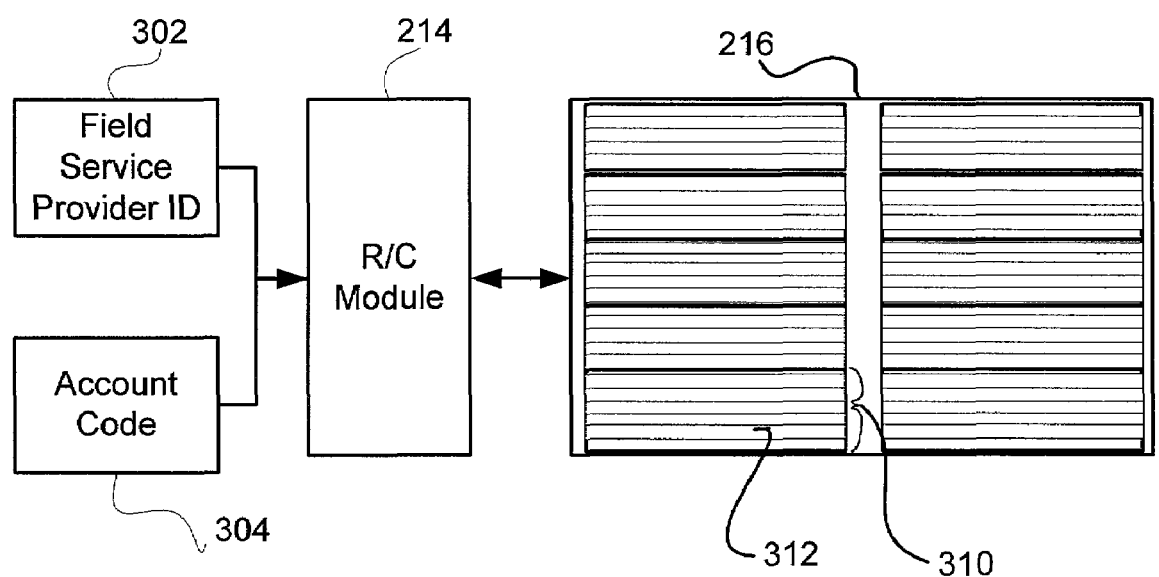
FIG. 3 is a functional diagram of a registration/communication module and a storage module of the network advisory system shown in FIG. 2 in accordance with an embodiment of the present invention.

FIG. 3 illustrates components of an R/C module 214 through which a field service provider 122 or a management system 134 accesses a NAS 100 in accordance with an embodiment of the present invention. As an example and not by means of limitation, the advisory information provided by the NAS 100 to the field service provider 122 and the management system 134 may take the form of a script. As such, FIG. 3 is illustrated in reference to a field service provider 122 or management system 134 accessing the NAS 100 and receiving one or more scripts via a R/C module 214. Furthermore, because FIG. 3 relates to retrieval of one or more scripts upon request by a field service provider 122 or a management system 134, FIG. 3 is illustrated below as field service providers 122 and management systems 134 are hereafter referred to as "requesting entities."

In accordance with an embodiment, the transmittal of a specific script by the NAS 100 to the requesting entity is based on data type information defined by identification code 302 assigned to the requesting entity and a customer account code 304 assigned to the entity—either a customer or a service providing company—associated with the destination facility, i.e., 116, 118 or 120, receiving the service. An identification code 302 is an exemplary form of a provider identifier assigned to either a field service provider 122 or a management system 134 accessing the NAS 100. Likewise, a customer account code is an exemplary form of a customer account identifier assigned to either a customer or a service providing company associated with the destination facility, i.e., 116, 118 and 120, at which a service is to be performed. As an example to illustrate FIG. 3, the destination facility, i.e., 116, 118 and 120, receiving the service is described as a destination facility, i.e., 116, 118 and 120, associated with a customer of a service providing company. As such, a requesting entity provides the service as an agent of the service providing company. In accordance with other embodiments, the destination facility, i.e., 116, 118 and 120, may be associated with the service providing company. Regardless of the embodiment, each destination facility, i.e., 116, 118 and 120, may be associated with one or more customer account codes 304.

The customer account code 304 identifies both the entity receiving the service and the specific account of the customer to which a service is to be provided. Hence, the customer account code 304 may specify the service providing company or a customer of the service providing company. The customer account code 304 may be one parameter used by the R/C module 214 to specify the appropriate scripts to be provided to the requesting entity. As such, the customer account code 304 is shown in FIG. 3 as specifying the appropriate scripts to be provided. Further, the customer account code 304 may identify a specific service to be provided to the customer identified by the customer account code 304. As described below, a customer may be associated with multiple customer account codes 304, with each customer account code 304 relating to a specific utility device. The specific utility devices may be of the same type or of different types; however, even if the utility devices are of the same type, data may be collected from and scripts may be provided based on separate customer account codes 304.

As mentioned, the requesting entity may access the NAS 100 by first connecting to the R/C module 214 through some type of network connection 132. The network connection 132 may be a wireless connection. The network connection 132 may also be a landline connection, such as through the Internet or a land-based telephone line. As described above, if the network connection 132 allows the transfer of visual scripts, the scripts transmitted to the requesting entity are preferably formatted as audio/visual scripts. Hence, whereas the data-type of the scripts is determined based on the identification code 302 and the customer account code 304, the formatting, i.e., binary, textual, audio or audio/visual, of the scripts may be determined by the type of network connection 132 through which the requesting entity is connected to the R/C module 214.

Once connected to the R/C module 214, the requesting entity inputs the identification code 302 specific to the requesting entity and the customer account code 304 specific to the customer account receiving the services of the requesting entity. As mentioned, the customer account code 304 is a string of characters—letters or numbers—recognized by the R/C module 214 as specifying a particular customer and service to be provided. The customer account code 304 is specific to the customer in that no two customers, and therefore no two customers of the service providing company are identified using the same customer account code 304. Thus, the customer account code 304 not only identifies a particular customer, but also identifies a specific account for the customer. For instance, a customer may lease a laundry machine and a vending machine from the service providing company. As such, the customer account code 304 associated with the laundry machine is preferably identified using a different character string than the customer account code 304 associated with the vending machine. For instance, the customer account code 304 for the laundry machine may be "00001.001," whereas the customer account code 304 for the vending machine may be "00001.002." Further illustrating this example, whereas the first five characters represent the customer code for the specific customer, the last three characters, "0.001" and "0.002," represent the specific accounts of the customer identified by "0.00001."

Likewise, the identification code 302 is a string of characters—letters or numbers—recognized by the R/C module 214 as specifying a particular requesting entity. The identification code 302 is specific to the requesting entity such that no other field service provider 122 or management system 134 employed by the providing company is identified by that identification code 302. Because the identification code 302 is specific to each requesting entity, each identification code 302 may be recognized by the R/C module 214 as identifying the requesting entity as a specialist in a particular service area. For instance, the R/C module 214 may identify the requesting entity as a ware washer repairman based on the identification code 302. In accordance with one embodiment, the requesting entity is a person and the identification codes 302 for each requesting entity employed by the service providing company are set up such that the first two characters identify each requesting entity as belonging to a specific specialty area as shown below in Table 3. Additionally, the identification codes 302 for each requesting entity may be set up such that the characters to the right of the specialty identifier distinguish each person individually. In the illustrations shown in Tables 3 and 4, an example identification code may be "XXYYYY" where "XX" identify the requesting entity by specialty area and "YYYY" identifies the requesting entity individually. Hence, as an example, the identification code 302 referenced as "020002" identifies John Smith and the fact that Mr. Smith is an account/invoice specialist.

TABLE 3

| Specialty Identifier ("XX") | Specialty Area |
|---|---|
| 00 | Ware washer technician |
| 01 | Vending machine re-supplier |
| 02 | Account/Invoice Specialist |
| . | . |
| . | . |
| . | . |
| 99 | HVAC technician |

TABLE 4

| Individual Identifier ("YYYY") | Individual |
|---|---|
| 0001 | John Doe |
| 0002 | John Smith |
| . | . |
| . | . |
| . | . |
| 9999 | Jane Smith |

Figure 6:
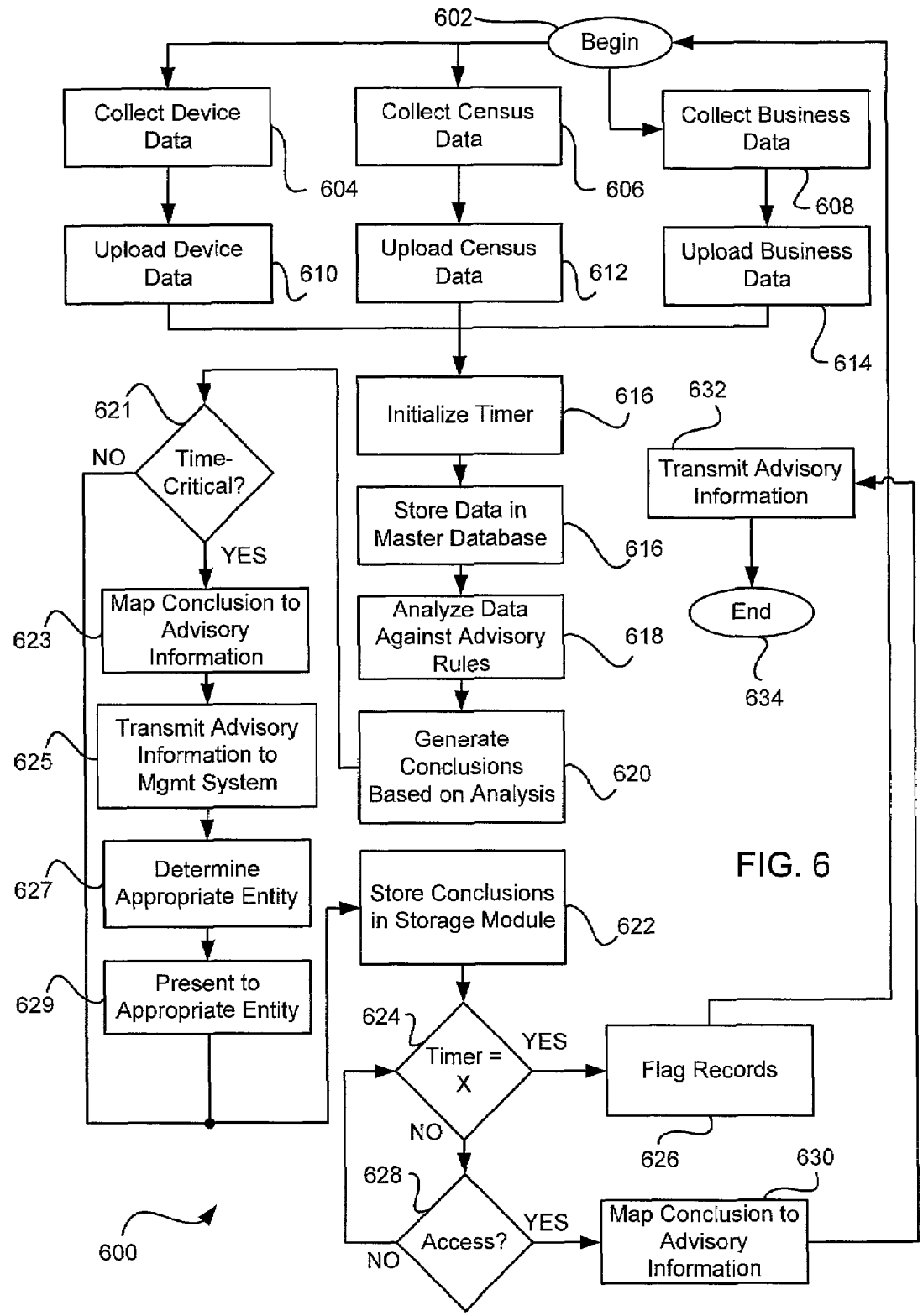
FIG. 6 is a flow diagram that illustrates operational characteristics shown in FIG. 4 in more detail in accordance with an alternative embodiment of the present invention.

The record of the storage module 216 are designed such that each customer may be identified with one or more customer account records 310 (FIG. 3). The customer account records 310 are preferably identified by the R/C module 214 based on a specific customer account code 304 of the customer that the record is associated with. Thus, a customer may be associated with as many customer account records 310 as the customer has accounts, and thus customer account codes 304. Each customer account record 310 is further divided into data-type records 312 that store data-type specific scripts. In accordance with an embodiment, each customer account record 310 may contain a device data record, a census data record and an business data record for storing scripts derived from device data 202, census data 204 and business data 206, respectively. As described in more detail in FIG. 9, the R/C module 214 may access the appropriate customer 310 and data type 312 records based upon the identification code 302 and the customer account code 304 input by the requesting entity. The R/C module 214 then retrieves the script stored in the accessed data-type record 312 and transmits the retrieved script to the requesting entity. Alternatively, the scripts may be mapped once the requesting entity accesses the appropriate data-type record 312, as shown in FIG. 6 in accordance with this alternative embodiment.

A computing device, such as advisory module 102, typically includes at least some form of computer-readable media. Computer readable media can be any available media that can be accessed by the advisory module 102. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the advisory module 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In accordance with one embodiment, a network advisory process may begin with one of two situations. First, a network advisory process may begin once a time-critical situation is identified at a destination facility, i.e., 116, 118 or 120. The NAS 100, after detecting that a time-critical situation has developed, alerts a management system 134 and the management system 134 thereafter determines which field service providers 122 should be contacted to address the situation, as earlier described. Second, a network advisory process may begin once a requesting entity—a field service provider 122 or a management system 134—connects with an R/C module 214 through a network connection 132. As noted above, the R/C module 214 is the interface of the NAS 100 through which the requesting entity accesses the NAS 100. As such, the requesting entity connects and communicates with the R/C module 214 through the use of a network device having a human interface device or module. As mentioned, the network connection 132 may be through the Internet, a telephone, a wireless communication device, or any other conventional means for remotely connecting to a computer network. Through the R/C module 214 the user will sign on as a user of the NAS 100.

Figure 4:
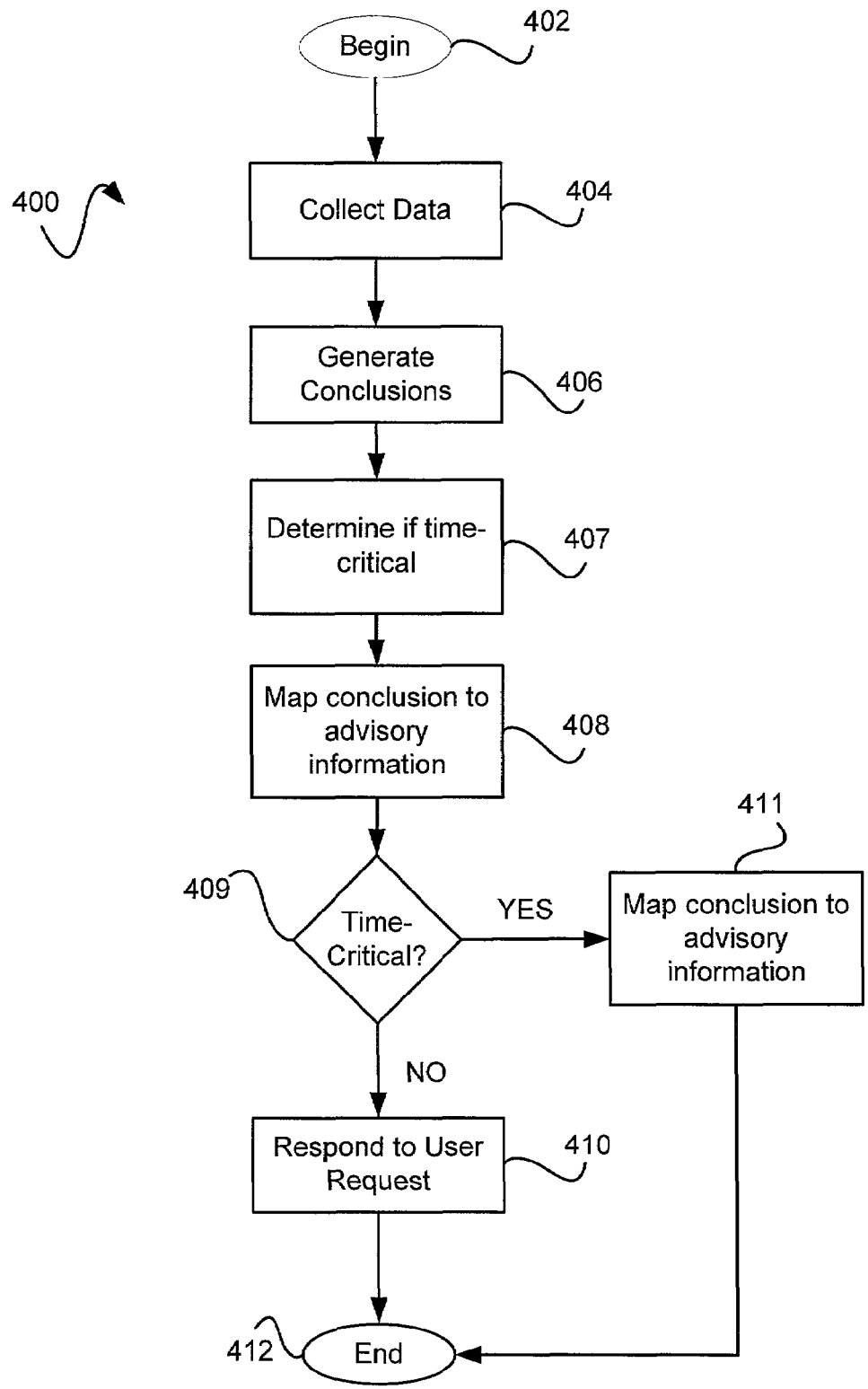
FIG. 4 is a flow diagram that illustrates operational characteristics for generating and providing advisory information in accordance with an embodiment of the present invention.

FIG. 4 illustrates operations performed by the NAS 100 as the NAS 100 administers a network advisory process 400 in accordance with one embodiment of the present invention. Referring to FIG. 4, a network advisory process 400 generally illustrating operations for generating and providing advisory information to a management system 134 and/or a field service provider 122 through the NAS 100 is shown in accordance with an embodiment of the present invention. In accordance with one embodiment, the advisory information may be related to a time-critical situation. In accordance with another embodiment, the advisory information may be related to a non time-critical situation at a destination facility, i.e., 116, 118 and 120.

The network advisory process 400 comprises an operation flow beginning with start operation 402 and concluding with termination operation 412. For simplicity, the network advisory process 400 is described below as collecting a single form of data from a single destination facility, i.e., 116, 118 and 120. Moreover, the destination facility 116, 118 or 120 is described below as being associated with a customer of a service providing company employing a service providing company to provide a service to the customer on behalf of the company. The service providing company may include a management system 134 for overseeing duties/responsibilities of field service providers 122 that physically provide services to the customers at the destination facility, i.e., 116, 118 and 120. Generally, however, the NAS 100 may be used to simultaneously collect various forms of data from multiple destination facilities, i.e., 116, 118 and/or 120, serviced by the service providing company. Furthermore, for each destination facility, i.e., 116, 118 and/or 120, serviced by the service providing company, there are generally two forms of data that are collected: device data 202 and account data 203, which includes, without limitation, business data 206 and census data 204.

Operation flow begins in start operation 402 and continues to collection operation 404. Collection operation 404 collects data from the destination facility, i.e., 116, 118 and 120. The data are used by the NAS 100 to generate advisory information. As an example, and not by way of limitation, collection operation 404 collects data associated with a utility device to which a service is to be provided by a field service provider 122 employed by the service providing company. More specifically, the process 400 is hereafter described with reference to the utility device being an industrial laundry machine. As such, device data collected may relate to a water level in a wash basket of the laundry machine at initial rinse, business data collected may relate to the balance due on a lease of the laundry machine and census data collected may relate to the amount of laundry detergent used in the laundry machine over a given period of time.

Once data is collected in collection operation 404, operation flow passes to generation operation 406. Generation operation 406 generates data conclusions by analyzing the collected data of each data type against advisory rules associated with each specific data type. The collected data are analyzed against the advisory rules to generate conclusions illustrative of the results of the analysis. Each advisory rule includes at least one advisory condition relating a collected sample of data to one or more operating and/or threshold parameters associated with the general and specific data type. The analysis may be as simple as a comparison of a single sample of collected data to operating and/or threshold parameters of a single advisory condition or as complex as an interpretation of multiple samples of collected data against a complex set of advisory rules each having multiple advisory conditions to which the data are analyzed against.

As an illustration of a simpler example, device data 202 collected by collection operation 404 may be compared to operating parameters associated with a predefined water level range of the wash water level of the wash basket during initial rinse. The data conclusion will thus specify whether the device is operating properly, i.e., whether the water level in the wash basket is too high or too low.

As an illustration of a more difficult example, multiple samples of device data 202 associated with a conventional warewashing machine may be analyzed together against a complex set of advisory rules to generate one or more conclusions. Conventional warewashing machine typically include a wash reservoir, a rack conveyor, and a final rinse manifold. The samples of device data characterize warewasher operating conditions, such as, without limitation, detergent usage and concentration, wash tank temperature, final rinse pressure, and final rinse temperature. Each change in final rinse temperature may indicate that a rack of dishes is passing through the machine. For each rack passing through the machine, the dishes are sprayed with a constant volume of final rinse water that flows off the dishes and into the wash tank. As final rinse water flows into the wash tank reservoir, the tank level rises, thereby overflowing into a discharge pipe. The additional water volume dilutes the detergent concentration, requiring the addition of more detergent. Under stable operating conditions, the amount of detergent added, over time, is directly proportional to the number of racks processed, as measured by the number of times the final rinse is activated.

The fact that detergent usage, as measured by empty container alarms, is out of line with respect to the number of racks washed may be an indication that the fill valve to supply fresh water to the wash tank reservoir is leaking or stuck in an open position. As such, each independent parameter, detergent usage and final rinse activation may be analyzed against multiple advisory rules for a particular machine configuration. This analysis generates one or more data conclusions that may suggest to the service provider whether there exists a leak in the wash tank fill valve.

Once generation operation 406 has generated data conclusions for the collected data, operation flow passes to map operation 408. Map operation 408 maps the data conclusions generated by generation operation 406 to advisory information that relates the data conclusions to a format recognizable to a management system 134 and/or a field service provider 122. In accordance with an embodiment, the advisory information may take the form of scripts, which are customized messages defined in a textual, binary, or an audio and/or visual format.

Operation flow passes from map operation 408 to escalation operation 409. Escalation operation 409 determines whether the advisory information is related to a time-critical situation. In accordance with an embodiment, escalation operation 409 administers the analysis at the data conclusion level by analyzing the generated data conclusions against escalation rules corresponding to the general and specific data types of each data conclusion to determine whether a time-critical situation is present at a destination facility, i.e., 116, 118 or 120. As such, the analysis administered by escalation operation may occur prior to the data conclusion being mapped to advisory information. In accordance with an alternative embodiment, the analysis is administered at the advisory information level. If escalation operation 409 determines that the conclusions or, alternatively, the advisory information, is related to a time-critical situation, operation flow passes to transmission operation 411 once the advisory information is generated from the data conclusion. Transmission operation 411 transmits the time-critical advisory information to the management system 134, which, based on the general and specific data type associated with the time-critical information, selects one or more appropriate field service providers 122 to address the situation. Specifically, transmission operation 411 presents the advisory information to the management system 134 at the network device through which the management system 134 and the NAS 100 are communicating via a network connection 132. Following transmission operation 411, operation flow concludes with termination operation 412.

If escalation operation 409 determines that a data conclusion is not related to a time-critical situation, operation flow passes to response operation 410 once a requesting entity—either a management system 134 or a field service provider 122—connects to the NAS 100 through a network connection 132. As mentioned, the network connection 132 is preferably a wireless connection, but may be any type of network connection 132 allowing connection to a remote computer. Response operation 410 guides the requesting entity through an accessing procedure. The accessing procedure determines whether the requesting entity should be granted access to the NAS 100 as a user. Specifically, once the requesting entity is connected to the NAS 100 as a user, the requesting entity inputs authentication and identification information through the R/C module 214. Upon entering a valid identification code 302, the requesting entity is authenticated and allowed to log on the NAS 100 as a user.

In order to request specific advisory information, the requesting entity inputs a customer account code 304. As described below and throughout the specification, the customer account code 304 identifies a specific customer account to which the requesting entity is to provide a service. Broadly defined, the customer account code 304 may be used to identify a specific destination facility, i.e., 116, 118 or 120, regardless of whether that destination facility 116, 118 or 120 is associated with a particular customer.

Response operation 410 responds by presenting the appropriate advisory information to the requesting entity based on the identification code 302 and the customer account code 304 input to the NAS 100 by the requesting entity. Specifically, the customer account code 304 specifies the customer account record 310 for response operation 410 to access and the identification code 302 specifies the data-type record 312 for response operation 410 to access based on the area of specialty of the requesting entity. Response operation 410 may present the advisory information to the requesting entity at the network device through which the requesting entity and the NAS 100 are communicating via a network connection 132. Once response operation 410 has accessed the appropriate data-type record 312 and transmitted the advisory information stored in the record 312 to the requesting entity, operation flow concludes with termination operation 412.

Figure 5:
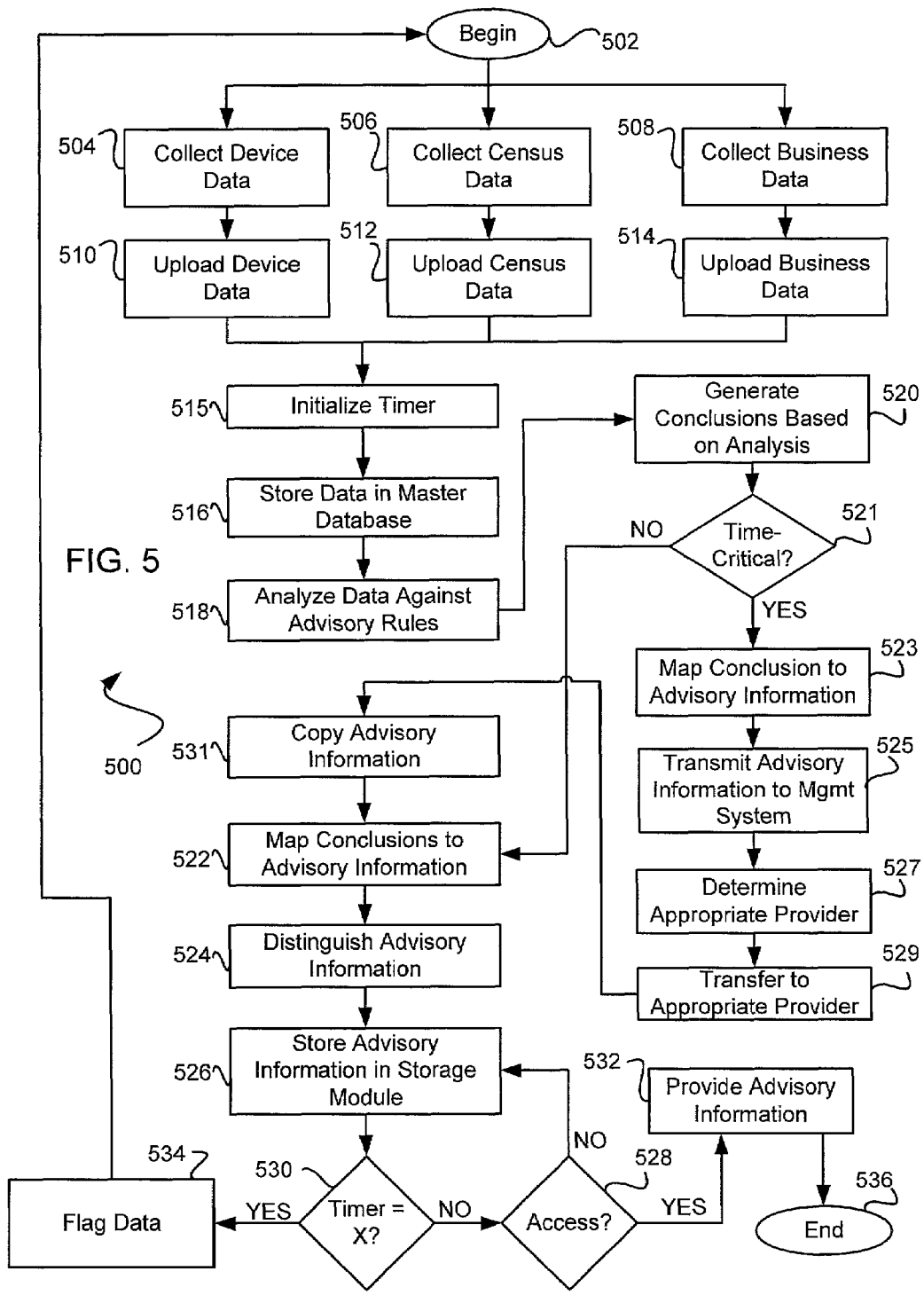
FIG. 5 is a flow diagram that illustrates operational characteristics shown in FIG. 4 in more detail in accordance with an embodiment of the present invention.

FIG. 5 is a network advisory process 500 more particularly illustrating the operations shown in the network advisory process 400 as the NAS 100 generates and provides advisory information to a field service provider 122 and/or a management system 134 in accordance with an embodiment of the present invention. As an example and not a limitation, the network advisory process 500 is described in FIG. 5 as collecting data and providing advisory information generated from the data. In accordance with an embodiment, the advisory information generated by the network advisory process 500 is illustrated as taking the form of a script.

The network advisory process 500 comprises an operation flow beginning with start operation 502 and concluding with termination operation 536. For simplicity, the network advisory process 500 is described below as collecting a single form of data from a single destination facility, i.e., 116, 118 and 120. Moreover, the destination facility 116, 118 or 120 is described below as being associated with a customer of the service providing company employing a service providing company to provide a service to the customer. The service providing company may include a management system 134 for overseeing duties/responsibilities of field service providers 122 that physically provide services to the customers at the destination facilities, i.e., 116, 118 and 120. Generally, however, the NAS 100 may be used to simultaneously collect various forms of data from multiple destination facilities, i.e., 116, 118 and/or 120, serviced by the service providing company. Furthermore, for each destination facility, i.e., 116, 118 and/or 120, serviced by the service providing company, there are generally two forms of data that are collected: device data 202 and account data 203, which includes, without limitation, business data 206 and census data 204. Furthermore, the destination facility, i.e., 116, 118 and 120, where a service is provided may or may not be associated with a customer.

The network advisory process 500 begins with start operation 502 and passes to collection operations 504, 506 and 508. As an example, and not by limitation, collection operations 504, 506 and 508 collect data associated with a utility device serviced by the service providing company. More specifically, the network advisory process 500 is hereafter described with reference to the utility device being an industrial laundry machine. Device collection operation 504 collects device data 202 associated with the utility device to which the service providing company is employed to provide a service, i.e., some type of maintenance to the laundry machine. Likewise, census collection operation 506 collects census data 204 associated with the utility device and/or customer to which the service providing company is employed to provide a service and business collection operation 508 collects business data 206 associated with the utility device and/or customer to which the service providing company is employed to provide a service. As such, the device data 202 collected may relate to a water level in a wash basket of the laundry machine during initial rinse, the business data 206 collected may relate to the balance due on a lease of the laundry machine and the census data 204 collected may relate to the amount of laundry detergent used in the laundry machine over a given period of time.

Once the various forms of data are collected by collection operations 504, 506 and 508, operation flow passes to upload operations 510, 512 and 514. Upload operations 510, 512 and 514 each upload the type of data collected by collection operations 504, 506 and 508, respectively, to one or more databases, such as databases 110, 112 and 114, and/or 208 accessible to the advisory module 102. As such, device upload operation 510 may upload the collected device data 202 to the master database 208, census upload operation 512 may upload the collected census data 204 to the master database 208 and business upload operation 514 may upload the collected business data 206 to the master database 208.

Once data is uploaded to the master database 208, operation flow passes to initialization operation 515. Initialization operation 515 initializes a clocking mechanism used to reference the length in time that collected data are stored in the master database 208. The clocking mechanism may also be used to reference the length in time that advisory information is stored in the storage module 216. Once the timer is initiated, operation flow passes to data storage operation 516. Data storage operation 516 stores the uploaded data in the master database 208 as described in conjunction with FIG. 2, in accordance with an embodiment of the invention.

The data stored in the master database 208 are then analyzed against advisory rules by analysis operation 518. As described above, the advisory rules are not only specific to the general data type, i.e., device, business or census, of the collected data, but also a specific data type related to the origin of the source of the collected data. For instance, whereas water temperature of a conventional laundry reservoir may be analyzed against one or more device data advisory rules specific to water temperature, the velocity of the reservoir spin may be analyzed against one or more device data advisory rules specific to reservoir velocity. An example of such an analysis is described below with reference to FIG. 7. Based on the analysis, data conclusions are generated by generation operation 620. Based on the analysis, data conclusions are generated by generation operation 520. The data conclusions are predefined identifiers associated with each independent result obtained by analysis operation 518. Once the conclusions are generated, operation flow passes to escalation decision operation 521. For simplicity, FIG. 5 is illustrated in operations 521, 522, 523, 525, 527, 529 and 531 with reference to a single sample of data.

Escalation decision operation 521 determines by a conclusion-by-conclusion analysis whether a data conclusion generated by generation operation 520 is related to a time-critical situation. If escalation decision operation 521 identifies a data conclusion related to a time-critical situation, operation flow passes to time-critical map operation 523. Time-critical map operation 523 maps the time-critical data conclusion to advisory information that relates the results derived by analysis operation 518 to a format recognizable to a management system 134. Operation flow passes from time-critical map operation 523 to time-critical transmit operation 525, which transmits the time-critical advisory information to the management system 134. Specifically, time-critical transmit operation 525 presents the advisory information to the management system 134 at the network device through which the management system 134 and the NAS 100 are communicating via a network connection 132. As an example and not a means of limitation, the time-critical advisory information may take the form of a script in a textual, binary or an audio and/or visual format. Illustrating this example, FIG. 5 is hereafter described as the network advisory process 500 provides scripts to the management system 134. As such, the management system 134 is alerted of the time-critical situation. Once the data conclusion is mapped and transmitted to the management system 134, operation flow passes to provider determination operation 527.

Provider determination operation 527 determines the appropriate one or more field service providers 122 that should be contacted to address the time-critical situation. Once these providers 122 are determined, operation flow passes to provider transmit operation 529, which transmits the time-critical script(s) to the appropriate one or more field service providers 122, as determined by provider determination operation 527. Specifically, transmit operation 525 presents the advisory information to the appropriate field service providers 122 at the network device through which the field service providers 122 and the NAS 100 or the management system 134 interact. Once the time-critical advisory information is transmitted to the appropriate field service provider(s) 122, operation flow passes to copy advisory information operation 531, which produces a copy of the time-critical script. Operation flow passes from copy advisory information operation 531 to distinguish operation 524, which, as discussed below, prepares the copy of the script for storage in a storage module 216.

If, as described above, escalation operation 521 does not identify a data conclusion related to a time-critical situation, operation flow passes to map operation 522. Map operation 522 maps each data conclusion generated by generation operation 520 to advisory information that relates the results derived by analysis operation 518 to a format recognizable to the management system 134 and/or the field service provider 122. As an example and not a means of limitation, the non time-critical advisory information may take the form of a script in a binary, textual or an audio and/or visual format.

Regardless of whether a script relates to a time-critical or non time-critical situation, all scripts generated by the network advisory process 500 are distinguished based on data type and customer by distinguish operation 524. As such, scripts associated with device data 202 are distinguished from scripts associated with business and census data. Operation flow then passes to storage operation 526. Storage operation 526 oversees storage of the scripts in a two-tier organizational storage module 216 based on organization determined by distinguish operation 524. The scripts are first stored in customer account records 310 identified by the customer account code 304 of each particular customer and account. Within each customer account record 310, the scripts are further divided into data-type records 312 based on the subject matter, or content, of the data, i.e., device, business or census. As mentioned above, the data-type records 312 are divisions, or groups, of customer account records 310 such that each customer account record 310 contains at least three data-type records 312: a device data record, a business data record and a census data record.

Once scripts are stored in the storage module 216, operation flow passes to timer operation 530. Timer operation 530 determines whether data and scripts stored in the master database 208 and the storage module 216, respectively, have been maintained in records of the database 208 and module 216 for a predetermined time period. This determination is conducted at a record-by-record level. As described earlier, the clocking mechanism monitored by timing operation 530 is initialized to start counting by initialization operation 515. Once the time of the clocking mechanism reaches "X" count, which is a count of the clocking mechanism in seconds, minutes, hours, or days, operation flow passes from timer operation 530 to flag operation 534. In flag operation 534, data that has been in the records of the master database 208 and the scripts stored in the records of the storage module 216 for "X" amount of time are flagged such that the records storing the data and the scripts are written over during subsequent network advisory process 500 passes. Flag operation 534 may also be referred to as a "data refresh" operation wherein the data flagged by the operation 534 is data that is to be refreshed with updated collected data. Operation flow then passes to start operation 502 and continues as data is collected, uploaded and then stored in the records of the database 208 previously flagged.

If timer operation 530 determines that data and scripts stored in records of the master database 208 and the storage module 216, respectively, have not been maintained in the records for the predetermined time period, operation flow passes to decisional operation 528. Decisional operation 528 awaits access to the NAS 100 by a requesting entity—a management system 134 or a field service provider 122. In particular, if decisional operation 528 determines that access has not been granted to a requesting entity, then operation flow passes to timer operation 530 and is continuously looped until either access is granted or the timer operation 530 indicates that the data and scripts have been maintained in at least one record of the master database 208 and the storage module 216, respectively, for the predetermined time period. Once the NAS 100 is accessed, operation flow passes to transmission operation 532. Transmission operation 532 retrieves the appropriate script requested by the requesting entity and transmits the script to the requesting entity over the network connection 132 through which the requesting entity is connected. Specifically, transmission operation 532 presents the advisory information to the requesting entity at the network device through which the requesting entity and the NAS 100 are communicating via a network connection 132. Operation flow then concludes at termination operation 536. In accordance with an embodiment, the fact that a script is provided to a requesting entity has no bearing on whether the data is thereafter refreshed. Indeed, the requesting entity may subsequently access the NAS 100 and retrieve the same script previously accessed, so long as the data has not been prepared for refresh by flag operation 534. Alternatively, the NAS 100 may refresh the scripts following each access.

FIG. 6 is a network advisory process 600 more particularly illustrating operations shown in the network advisory process 400 as the NAS 100 generates and provides advisory information to a field service provider 122 and/or a management system 134 in accordance with an alternative embodiment of the present invention. Specifically, operations 602, 604, 606, 608, 610, 612, 614, 616, 618 and 620 in FIG. 6 are substantially identical to operations 502, 504, 506, 508, 510, 512, 514, 516, 518 and 520 in FIG. 5. However, in the alternative embodiment described in FIG. 6, mapping advisory information to a data conclusion based on a specific customer and subject matter is administered either as advisory information is automatically transmitted to a management system 134 or as a field service provider 122 is granted access to the NAS 100. As with FIG. 5, the network advisory process 600 is described in FIG. 6 as collecting data and providing advisory information generated from the data. In accordance with an embodiment of the invention, the advisory information provided by the network advisory process 600 is illustrated as taking the form of a script.

The network advisory process 600 comprises an operation flow beginning with start operation 602 and concluding with termination operation 634. For simplicity, the network advisory process 600 is described below as collecting a single form of data from a single destination facility, i.e., 116, 118 and 120. Moreover, the destination facility 116, 118 or 120 is described below as being associated with a customer of a service providing company employing a service providing company to provide a service to the customer. The service providing company may include a management system 134 for overseeing duties/responsibilities of field service providers 122 that physically provide services to the customers at the destination facility, i.e., 116, 118 or 120. Generally, however, the NAS 100 may be used to simultaneously collect various forms of data from multiple destination facilities, i.e., 116, 118 and/or 120, serviced by the service providing company. Furthermore, for each destination facility, i.e., 116, 118 and/or 120, serviced by the service providing company, there are generally two forms of data that are collected: device data 202 and account data 203, which includes, without limitation, business data 206 and census data 204. Furthermore, the destination facility, i.e., 116, 118 or 120, where a service is provided may or may not be associated with a customer.

The network advisory process 600 begins with start operation 602 and passes to collection operations 604, 606 and 608. As an example, and not by limitation, collection operations 604, 606 and 608 collect data associated with a utility device serviced by the service providing company. More specifically, the network advisory process 600 is hereafter described with reference to the utility device being an industrial laundry machine. Device collection operation 604 collects device data 202 associated with the utility device to which the service providing company is employed to provide a service, i.e., some type of maintenance to the laundry machine. Likewise, census collection operation 606 collects census data 204 associated with the utility device to which the service providing company is employed to provide a service and business collection operation 608 collects business data 206 associated with the utility device to which the service providing company is employed to provide a service. As such, the device data 202 collected may relate to a water level in a wash basket of the laundry machine during initial rinse, the business data 206 collected may relate to the balance due on a lease of the laundry machine and the census data 204 collected may relate to the amount of laundry detergent used in the laundry machine over a given period of time.

Once the various forms of data are collected by collection operations 604, 606 and 608, operation flow passes to upload operations 610, 612 and 614. Upload operations 610, 612 and 614 each upload the form of data collected by collection operations 604, 606, and 608, respectively, to one or more databases, such as 110, 112 and/or 114, and/or 208, accessible to the advisory module 102. As such, device upload operation 610 may upload the collected device data 202 to the master database 208, census upload operation 612 may upload the collected census data 204 to the master database 208 and account upload operation 614 may upload the collected business data 206 to the master database 208.

Once data is uploaded to the advisory module 102, operation flow passes to initialization operation 615. Initialization operation 615 initializes a clocking mechanism used to reference the length in time that collected data are stored in the master database 208. In accordance with an embodiment, the clocking mechanism may also be used to reference the length in time that scripts are stored in the storage module 216. Once the timer is initiated, operation flow passes to database storage operation 616. Data storage operation 616 stores the uploaded data in the master database 208 as described with reference to FIG. 2 in accordance with an embodiment of the present invention.

The data stored in the master database 208 are then analyzed against one or more advisory rules by analysis operation 618. As noted above, each advisory rule may include one or more advisory conditions associated with operating and/or threshold parameters related to the general and specific data type of the data sample. As described above, the advisory rules are not only selected based on the general data type, i.e., device, business or census, of the collected data, but also a specific data type related to the origin of the source of the collected data. For instance, whereas water temperature of a conventional laundry reservoir may be analyzed against one or more device data advisory rules specific to water temperature, the velocity of the reservoir spin may be analyzed against one or more device data advisory rules specific to reservoir velocity. An example of such an analysis is described below with reference to FIG. 7. Based on the analysis, data conclusions are generated by generation operation 620. The data conclusions are predefined identifiers associated with each independent result obtained by analysis operation 618. Once the conclusions are generated, operation flow passes to escalation decision operation 621. For simplicity, FIG. 6 is illustrated in operations 621, 622, 623, 625, 627 and 629 with reference to a single sample of data.

Escalation decision operation 621 determines through a conclusion-by-conclusion analysis whether a data conclusion generated by generation operation 620 is related to a time-critical situation. If escalation decision operation 621 identifies a data conclusion related to a time-critical situation, operation flow passes to time-critical map operation 623. Time-critical map operation 623 maps the time-critical data conclusion to advisory information that relates the results derived by analysis operation 618 to a format recognizable to a management system 134. Operation flow passes from time-critical map operation 623 to transmit operation 625, which transmits the time-critical advisory information to the management system 134. Specifically, transmit operation 625 presents the advisory information to the management system 134 at the network device through which the management system 134 and the NAS 100 interact via a network connection 132. As an example and not a means of limitation, the time-critical advisory information may take the form of a script in a textual, binary or an audio and/or visual format. Illustrating this example, FIG. 6 is hereafter described as the network advisory process 600 provides scripts to the management system 134. As such, the management system 134 is alerted of the time-critical situation. Once the data conclusion is mapped and transmitted to the management system 134, operation flow passes to provider determination operation 627.

Provider determination operation 627 determines the appropriate one or more field service providers 122 that should immediately be contacted to address the time-critical situation. Once these providers 122 are determined, operation flow passes to provider transmit operation 629, which presents the time-critical script(s) to the appropriate one or more field service providers 122, as determined by provider determination operation 627. Specifically, transmit operation 629 presents the advisory information to the appropriate field service providers 122 at the network device through which the field service provider and the NAS 100 or the management system 134 interact via a network connection 132. Once the time-critical advisory information is presented to the appropriate field service provider(s), operation flow passes to conclusion storage operation 622. Conclusion storage operation 622 oversees storage of the data conclusion from which the time-critical script was generated in a two-tier organizational storage module 216.

If, as described above, escalation operation 521 does not identify a data conclusion related to a time-critical situation, operation flow passes to conclusion storage operation 622. As mentioned, conclusion storage operation 622 oversees storage of data conclusions—both time-critical and non time-critical—in a two-tier organizational storage module 216. The conclusions are first stored in customer account records 310 identified by the customer account code 304 associated with each particular customer account. Within each customer account record 310, the conclusions are further divided into data-type records 312 based on which type of data, i.e., device, account and census, of which the conclusion is related. As mentioned above, the data-type records 312 are divisions, or groups, of customer account records 310 such that each customer account record 310 contains at least three data-type records 312: a device data record, a business data record and a census data record.

Once the data conclusions are stored by conclusion storage operation 622, operation flow passes to timer operation 624. Timer operation 624 determines whether collected data and data conclusions stored in the master database 208 and the storage module 216, respectively, have been maintained in records of the database 208 and module 216 for a predetermined time period. This determination is concluded at a record-by-record level. As described earlier, the clocking mechanism monitored by timing operation 622 is initialized to start counting by initialization operation 615. Once the time of the clocking mechanism reaches "X" count, which is a count of the clocking mechanism in seconds, minutes, hours, or days, operation flow passes from timer operation 624 to flag operation 626. Flag operation 626 flags data that has been in the records of the master database 208 and data conclusions stored in the records of the storage module 216 for "X" amount of time such that the records storing the data and the conclusions are written over during subsequent network advisory process 600 passes. Flag operation 526 may also be referred to as a data refresh operation wherein the data flagged by the operation 526 is data that is to be refreshed with updated collected data. Operation flow then passes to start operation 602 and continues as data is collected, uploaded and then stored in the records of the database 208 previously flagged.

If timer operation 624 determines that data and conclusions stored in records of the master database 208 and the storage module 216, respectively, have not been maintained in the records for the predetermined time period, operation flow passes to decisional operation 628. Decisional operation 628 awaits access to a specific customer account record 310 and specific data-type record 312 by a requesting entity—either a management system 134 or a field service provider 122. In particular, if decisional operation 628 determines that access has not been granted to a requesting entity, operation flow passes to timer operation 624 and is continuously looped until either access is granted or the timer operation 624 indicates that the collected data and the data conclusions have been maintained in the records of the database 208 and the storage module 216, respectively, for the predetermined time period. Once the NAS 100 is accessed, operation flow passes to map operation 630.

Map operation 630 maps the conclusion associated with the specific data-type record 312 to which the requesting entity is granted access to a script. The scripts are mapped based on the identifier of the data conclusion. As mentioned above, the scripts may be in textual, binary, or audio and/or visual format. More detailed illustrations of the operations of the map operation 630 are shown and described above in Table 2 and below in FIG. 8. Once an appropriate script is mapped based on the customer account and the data type associated with the request, the script is then transmitted to the requesting entity by transmission operation 732. Specifically, transmission operation 732 presents the advisory information to the requesting entity at the network device through which the requesting entity and the NAS 100 or the management system 134 interact via a network connection 132. Operation flow then concludes at termination operation 634. In accordance with an embodiment, the fact that a script is provided to a requesting entity has no bearing on whether the data is thereafter refreshed. Indeed, the requesting entity may subsequently access the NAS 100 and retrieve the same script previously accessed, so long as the data has not been prepared for refresh by flag operation 626. Alternatively, the NAS 100 may refresh the scripts following each access.

Figure 7:
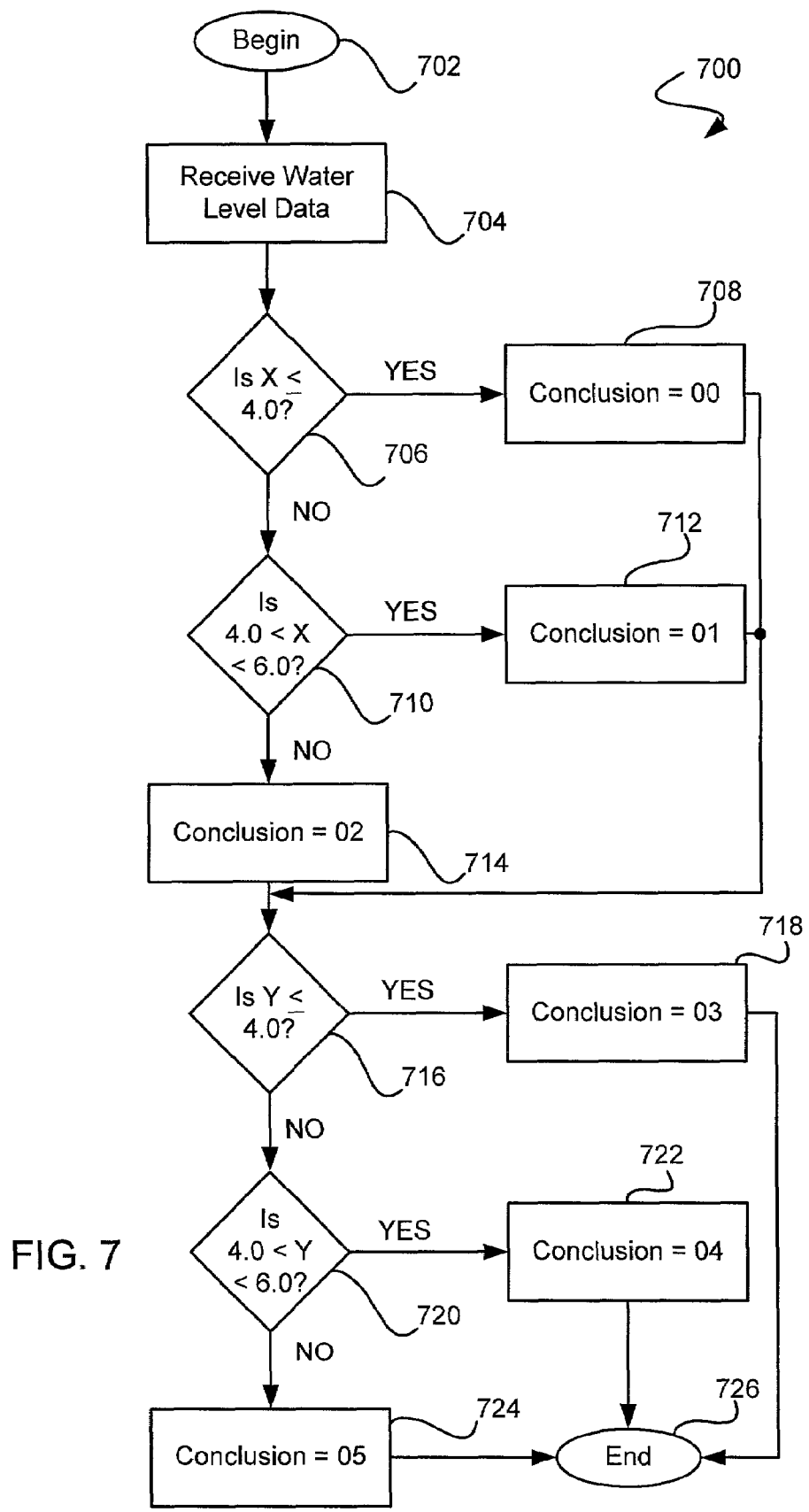
FIG. 7 is a flow diagram that illustrates operational characteristics related to generating a data conclusion from a sample of collected data in accordance with an embodiment of the present invention.

FIG. 7 is an illustration of operations performed by the analysis operation 518 and, in the alternative embodiment in FIG. 6, analysis operation 618, as the analysis operations 518, 618 analyze a collected sample of data against various advisory conditions of an advisory rule related to the sample of data. FIG. 7 also illustrates operations performed by generation operation 520 and, in the alternative embodiment in FIG. 6, generation operation 620, as the generation operations 520, 620 generate a data conclusion based on the aforementioned analysis. Specifically, an analysis/generation process 700 illustrates operations associated with analysis operations 518, 618 and generation operations 520, 620 as the analysis operations 518, 618 analyze a sample of device data 202 against an advisory rule associated with a conventional laundry machine and generation operations 520,620 generate a data conclusion based on the analysis. The analysis/generation process 700 illustrates a sample of data being analyzed against four advisory conditions, i.e. operations 706, 710, 716 and 720, of the advisory rule. As mentioned, advisory conditions relate the collected data to operating and/or threshold parameters by comparing the parameters to the collected data. As an illustration to FIG. 7 and not a limitation, the operating parameters are associated with gallons of water in a wash basket of the laundry machine. Whereas the analysis/generation process 700 illustrates analysis of a data sample against an advisory rule having only four advisory conditions for simplicity, it should be appreciated that an advisory rule may be much more complex, including any number of advisory conditions, which in turn, may include any number of operating and/or threshold parameters. The analysis/generation process 700 comprises an operation flow beginning with start operation 702 and concluding with termination operation 726.

The analysis/generation process 700 begins in start operation 702 following the conclusion of data storage operation 516 and, alternatively, data storage operation 616. Operation flow then passes to reception operation 704 as a sample of device data 202 is received into the intelligence module 210. Specifically, as an example to illustrate FIG. 7 and not as means of limitation, the sample of device data 202 received by reception operation 704 is data related to the water level of a wash basket of a conventional laundry machine. The sample contains an "X" parameter and a "Y" parameter. The "X" parameter is used to specify the water level of the wash basket during initial rinse and the "Y" parameter is used to specify the water level of the wash basket during a mid-cycle rinse.

Once the sample of device data is received by reception operation 704, operation flow passes to decisional operation 706. Decisional operation 706 determines whether the water level of the wash basket during initial rinse is less than or equal to 4.0 gallons. If the water level of the wash basket during initial rinse is less than or equal to 4.0 gallons, operation flow passes to generate conclusion operation 708. Generate conclusion operation 708 assigns a data conclusion of "00" to the water level of the wash basket during initial rinse. Once the data conclusion is generated, operational flow passes to decisional operation 716. If decisional operation 706 determines that the water level of the wash basket during initial rinse is not less than or equal to 4.0 gallons, operation flow passes to decisional operation 710.

Decisional operation 710 determines whether the water level of the wash basket during initial rinse is between 4.0 gallons and 6.0 gallons. If the water level of the wash basket during initial rinse is between 4.0 gallons and 6.0 gallons, operation flow passes to generate conclusion operation 712. Generate conclusion operation 712 assigns a conclusion of "01" to the water level of the wash basket during initial rinse. Once the data conclusion is generated, operational flow passes to decisional operation 716. If decisional operation 710 determines that the water level of the wash basket during initial rinse is not between 4.0 gallons and 6.0 gallons, operation flow passes to generate conclusion operation 714. Generate conclusion operation 714 assigns a conclusion of "02" to the water level of the wash basket during initial rinse.

Following generate conclusion operations 708, 712 and 714, operation flow passes to decisional operation 716. Decisional operation 716 determines the water level of the wash basket during mid-cycle rinse is less than or equal to 4.0 gallons. If the water level of the wash basket during mid-cycle rinse is less than or equal to 4.0 gallons, operation flow passes to generate conclusion operation 718. Generate conclusion operation 718 assigns a conclusion of "03" to the water level of the wash basket during mid-cycle rinse. Once the data conclusion is generated, operational flow concludes at termination operation 726. If decisional operation 716 determines that the water level of the wash basket during mid-cycle rinse is not less than or equal to 4.0 gallons, operation flow passes to decisional operation 720.

Decisional operation 720 determines whether the water level of the wash basket during mid-cycle rinse is between 4.0 gallons and 6.0 gallons. If the water level of the wash basket during mid-cycle rinse is between 4.0 gallons and 6.0 gallons, operation flow passes to generate conclusion operation 722. Generate conclusion operation 722 assigns a conclusion of "04" to the water level of the wash basket during mid-cycle rinse. Once the data conclusion is generated, operation flow concludes at termination operation 726. If decisional operation 720 determines that the water level of the wash basket during mid-cycle rinse is not between 4.0 gallons and 6.0 gallons, operation flow passes to generate conclusion operation 724. Generate conclusion operation 724 assigns a conclusion of "05" to the water level of the wash basket during mid-cycle rinse. Once the conclusion is generated, operation flow concludes at termination operation 726.

Figure 8:
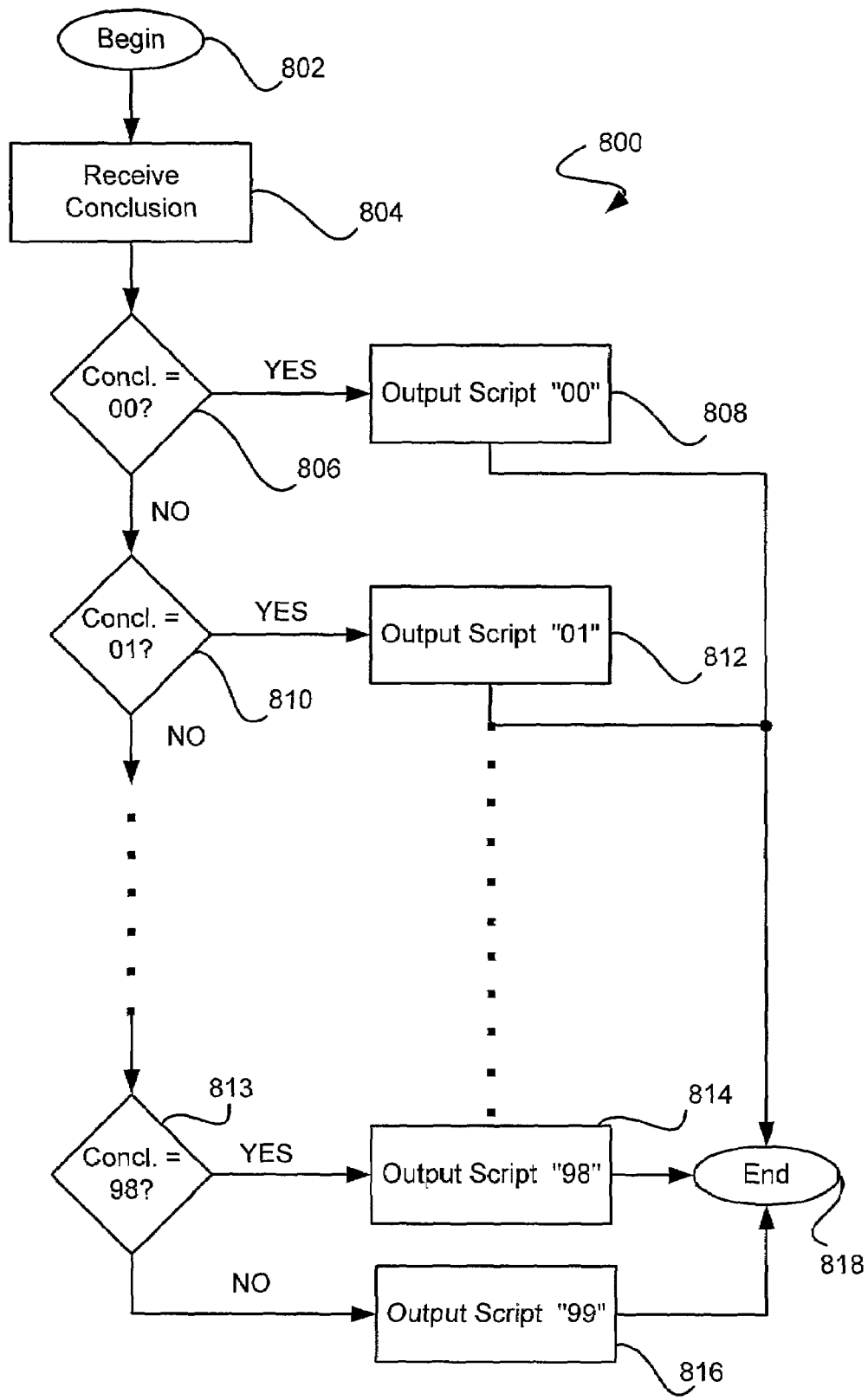
FIG. 8 is a flow diagram that illustrates operational characteristics related to mapping the data conclusion generated in the flow diagram of FIG. 7 to advisory information in accordance with an embodiment of the present invention.

FIG. 8 is an illustration of the operations performed by map operations 522 and 523, and, in the alternative embodiment in FIG. 6, map operations 630 and 623, as specific advisory information is mapped to a data conclusion generated by generation operation 520 and, alternatively in FIG. 6, generation operation 620. As such, the advisory information described in FIG. 7 takes the form of a script as an illustration of analysis operations 516, 518 and generation operations 520, 620 in the network advisory processes 500 and 600, respectively. Specifically, a mapping process 800 is shown mapping a data conclusion derived by the analysis performed in the analysis/generation process 700 in FIG. 7 to a script in a format recognizable to a field service provider 122 and/or a management system 134. For simplicity, the mapping process 800 is shown receiving a single data conclusion to be mapped to a script. Once the conclusion is mapped, the mapping process 800 is initialized to await reception of a subsequent conclusion.

The mapping process 800 comprises an operation flow beginning with start operation 800 and concluding with termination operation 818. Once at termination operation 818, operation flow is initialized to begin at start operation 802 as a subsequent data conclusion is received.

The mapping process 800 begins at start operation 802 and operation flow initially passes to reception operation 804. Reception operation 804 receives a data conclusion, such as a data conclusion generated by the analysis/generation process 700. With respect to the network advisory process 500, reception operation 804 may receive the data conclusion following either escalation operation 521 or copy operation 531. In the alternative embodiment in FIG. 6, reception operation 804 may receive the data conclusion following either escalation operation 621 or decisional operation 628. If reception operation 804 follows escalation operation 521, the conclusion is preferably received into reception operation 804 directly and without an access of the customer and data-type records 310 and 312, respectively. With respect to both non time-critical and time-critical data conclusions, if reception operation 804 follows decisional operation 628, reception operation 804 may first access the customer and data-type records 310 and 312, respectively, based on the identification code 302 and the customer account code 304 input by a requesting entity—either a management system 134 or a field service provider 122. Once the appropriate record is accessed, reception operation 804 receives the data conclusion stored in the record. With respect only to time-critical data conclusions, if reception operation 804 follows decisional operation 628, the data conclusion may be immediately received by reception operation 804 without being stored and accessed from a storage module 216.

Following reception of the data conclusion, operation flow passes to decisional operation 806. Decisional operation 806 determines whether the received data conclusion is identified as "00." If the conclusion is identified as "00," operation flow passes to output script operation 808. Output script operation 808 outputs the script associated with the "00" identifier to either the storage module 216, if the script is identified as non time-critical, or the management system 134, if the script is identified as time-critical. In the alternative embodiment illustrated in FIG. 6, output script operation 808 may output the script associated with the "00" identifier to a requesting entity—either a field service provider 122 and/or a management system 134—in accordance with transmission operation 632. In accordance with the example illustrated in Table 2, the script associated with the "00" identifier may be an audio script dictating that "the water level of the wash basket during initial rinse is below the expected range." Once the script is output to either the storage module 216, the field service provider 122 or the management system 134, operation flow concludes with termination operation 818.

If decisional operation 806 determines that the conclusion received by reception operation 804 is not identified as "00," operation flow passes to decisional operation 810. Decisional operation 810 determines whether the conclusion received by reception operation 804 is identified as "01." If the conclusion is identified as "01," operation flow passes to output script operation 812. Output script operation 812 outputs the script associated with the "01" identifier to either the storage module 216, if the script is identified as non time-critical, or the management system 134, if the script is identified as time-critical. In the alternative embodiment illustrated in FIG. 6, output script operation 812 may output the script associated with the "01" identifier to a requesting entity—either a management system 134 or a field service provider 122—in accordance with transmission operation 632. In accordance with the example illustrated in Table 2, the script associated with the "01" identifier may be an audio script dictating that "the water level of the water basket is within the expected range." Once the script is output to either the storage module 216, the field service provider 122 or the management system 134, operation flow concludes with termination operation 818. However, if decisional operation 810 determines that the data conclusion received by reception operation 804 is not identified as "01," operation flow continues to compare the received conclusion with all possible identifiers from "01" to "98," which in the example in FIG. 8 is the next to last possible identifier associated with data conclusions.

If operation flow reaches decisional operation 813, then decisional operation 813 determines whether the conclusion identifier is "98." If the conclusion identifier is "98," operation flow passes to output script operation 814. Output script operation 814 outputs the script associated with the "98" identifier to either the storage module 216, if the script is identified as non time-critical, or the management system 134, if the script is identified as time-critical. In the alternative embodiment illustrated in FIG. 6, output script operation 814 may output the script associated with the "98" identifier to a requesting entity—either a management system 134 or a field service provider—122 in accordance with transmission operation 632. Once the script is output to either the storage module 216, the management system 134 or the field service provider 122, operation flow concludes with termination operation 818. However, if decisional operation 812 determines that the conclusion identifier is not "98," then operation flow passes to output script operation 816. Operation script operation 816 outputs the script associated with the "99" identifier to either the storage module 216, if the script is identified as non time-critical, or the management system 134, if the script is identified as time-critical. In the alternative embodiment illustrated in FIG. 6, output script operation 816 may output the script associated with the "99" identifier to the requesting entity—either a management system 134 or a field service provider 122—in accordance with transmission operation 632. Once the script is output to either the storage module 216, the management system 134 or the field service provider 122, operation flow concludes with termination operation 818.

Figure 9:
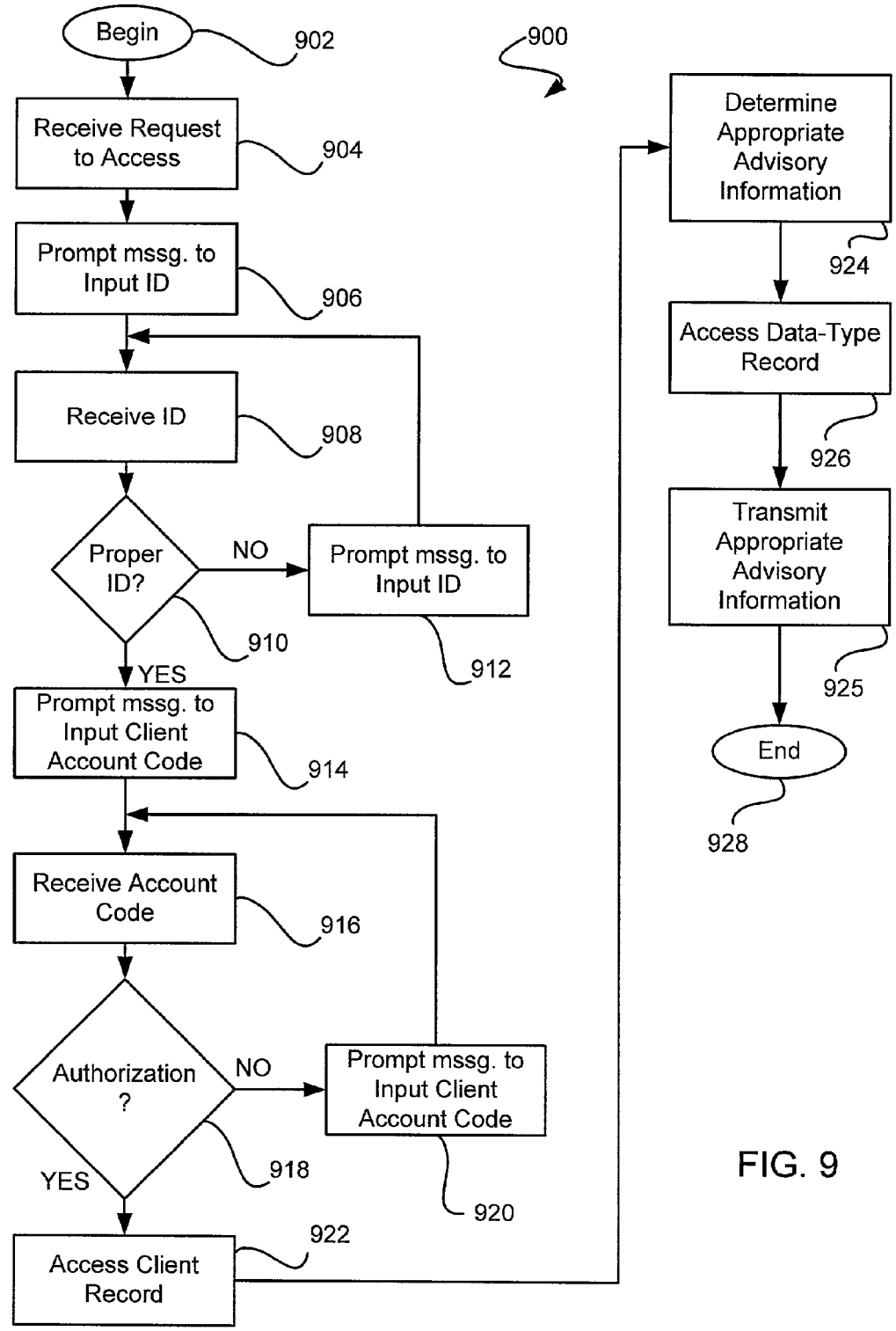
FIG. 9 is a flow diagram that illustrates operational characteristics related to identifying and authenticating a field service provider connected to the network advisory system of FIG. 1 over a network connection in accordance with an embodiment of the present invention.

FIG. 9 illustrates operations of the R/C module 214 as the module 214 manages the granting of access to the NAS 100 and the retrieval and transmittal of time-critical or non time-critical advisory information from the NAS 100 to a network-connected requesting entity, which may be a field service provider 122 or a management system 134, in accordance with a preferred embodiment of the invention. As described above, if a data conclusion is identified as relating to a time-critical situation, the data conclusion may be immediately mapped to advisory information and provided to a management system 134 automatically, i.e., without initial access by the management system 134. Besides being automatically transmitted to the management system 134, the time-critical advisory information may also be copied and the copy provided to a storage module 216 for storage so that the time-critical advisory information may thereafter be retrieved by the NAS 100 and provided to a requesting entity—either a management system 134 or a field service provider 122. As such, the requesting entity may request and be provided not only non time-critical advisory information, but also time-critical advisory information. In particular, FIG. 9 shows an identification and authentication process 900 illustrating operations of the R/C module 214 of the NAS 100.

As an example and not a means of limitation, the requesting entity described in conjunction with FIG. 9 is either a management system 134 or a field service provider 122 associated with a service providing company employed to provide service to one or more destination facilities, i.e., 116, 118 and 120, each associated with a single customer. As such, the requesting entity accesses specific customer 310 and data-type 312 records through an identification/authorization process 900. In accordance with one embodiment of the present invention and as shown in FIG. 1 at times $t_1$ and $t_3$, the requesting entity may connect to the NAS 100, gain access to the NAS 100 and receive advisory information by the NAS 100 while the requesting entity is in transit between destination facilities, i.e., 116, 118 and 120. The times $t_1$ and $t_3$ are typically referred to a "windshield time."

The identification/authentication process 900 comprises an operation flow beginning with start operation 902 and concluding with termination operation 928. From start operation 902, operation flow passes to reception operation 904. Reception operation 904 is triggered to receive a request to access the NAS 100 once a field service provider 122 connects to the NAS 100 through a network connection 132 to the R/C module 214. Once a request to access is received, operation flow passes to prompt identification code operation 906. Prompt identification code operation 906 prompts the requesting entity to enter the identification code 302 specific to the requesting entity. From prompt identification code operation 906, operation flow passes to reception operation 908.

At reception operation 908, the requesting entity enters the appropriate identification code 302 and the NAS 100 receives the identification code 302 through the R/C module 214. In accordance with various embodiments, the requesting entity may input the identification code 302 using any conventional input methods including, without limitation, voice recognition, retinal recognition, fingerprint recognition, touch-tone recognition, keyboard entry, computer mouse entry or any other input method allowing a user to gain access to a remote computer. From reception operation 908, operation flow passes to decisional operation 910. Decisional operation 910 determines whether the identification code 302 received by reception operation 908 is a valid identification code 302 specifying a field service provider 122 that is employed by the service providing company. If decisional operation determines that the identification code 302 is not a valid identification code, operation flow passes to second prompt identification code operation 912. Second prompt identification code operation 912 prompts the requesting entity that the previously entered identification code 302 is invalid and requests the requesting entity to input a second identification code 302. From second prompt identification code operation 912, operation flow returns to reception operation 908 and continues as discussed above. In accordance with an embodiment, a security module may be tied to the second prompt identification code operation 912 to maintain a record of the number of times that the NAS 100 has been incorrectly accessed during a current logon session. If an invalid identification code 302 is input a predetermined number of times during the current logon session, then the authentication/identification process 900 automatically terminates.

If decisional operation 910 determines that the identification code 302 entered is a valid identification code 302, then the requesting entity is recognized as a user and operation flow passes to prompt customer account code operation 914. Prompt customer account code operation 914 prompts the requesting entity to input a customer account code 304 specific to the customer account that is to be provided a service. From prompt customer account code operation 914, operation flow passes to reception operation 916.

Reception operation 916 receives the customer account code 304 through the R/C module 214. In accordance with various embodiments, the requesting entity may input the identification code 302 using any conventional input methods including, without limitation, voice recognition, fingerprint recognition, retinal recognition, touch-tone recognition, keyboard entry, computer mouse entry or any other input method allowing a user to gain access to a remote computer. From reception operation 916, operation flow passes to decisional operation 918. Decisional operation 918 determines whether the requesting entity is a user that should be granted access to the customer account records 310 of the customer of which the customer account code 304 is associated. If access to the customer account records 310 by the requesting entity is proper, operation flow passes to access operation 922. Access operation 922 grants access to the customer account record 310 associated with the customer account code 304. If decisional operation 918 determines that access is not proper, operation flow passes to second prompt customer account code operation 920. Second prompt customer account code operation 920 prompts the user that the previously entered customer account code 304 is associated with a customer account record 310 of which the requesting entity is not authorized to access. The second prompt customer account code operation 920 also requests the user to input a second customer account code 304. From second prompt customer account code operation 920, operation flow returns to reception operation 916 and continues as discussed above. In accordance with an embodiment, a security module may be tied to the second prompt customer account code operation 920 to maintain a record of the number of times that the NAS 100 has been incorrectly accessed. If an invalid identification code 302 is input a predetermined number of times, then the authentication/identification process 900 automatically terminates.

Once access operation 922 has granted the requesting entity access to the customer account records 310, operation flow passes to determination operation 924. Determination operation 924 determines which data-type record 312 of the customer account record 310 stores the advisory information that the requesting entity is requesting. As described in Table 3, this determination is based on a specialty area of the requesting entity and the particular customer account identified by the customer account record 310 of which the requesting entity is currently accessing. Once determination operation has determined the data-type record 312 storing the appropriate advisory information requested by the requesting entity, operation flow passes to retrieval operation 926. Retrieval operation 926 accesses the appropriate data-type record 312 specified by determination operation 924 and retrieves the advisory information stored in the record 312. Once the appropriate advisory information is retrieved, operation flow passes to transmission operation 926. Transmission operation 926 transmits the retrieved advisory information to the requesting entity over the network connection 132 through which the requesting entity is connected. From transmission operation 926, operation flow concludes with termination operation 928.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, the management system may prioritize responsibilities of a field service provider such that the field service provider may immediately address a time-critical situation. As such, besides providing time-critical advisory information to the field service provider, the management system may instruct the field service provider that a time-critical situation must be addressed prior to beginning, or even finishing, other responsibilities. Although the management system is described above as providing commercial, private services typically under some form of agreement, the management system may be employed by an emergency or public service providing company, such as a fire rescue unit, a police unit, a veterinary service, a hospitals and/or ambulance service, or any other service providing company generally employed to provide emergency services. Numerous other changes may be made which will readily suggest themselves to those skilled in the art and which are encompassed in the spirit of the invention disclosed and as defined in the appended claims.

What is claimed is:

1. A network advisory system interacting with a management system, the network advisory system comprising:

means for receiving collected data related to the service being provided by one or more field service providers managed by the management system, wherein the collected data is business data associated with a specific customer account for which the service is being provided;

means for analyzing the collected data to determine whether the collected data indicates a time-critical situation associated with the specific customer account;

means for mapping the collected data to time-critical advisory information when the collected data indicates a time-critical situation; and means for presenting the time-critical advisory information to the management system, wherein the presenting means presents the time-critical advisory information to a field service provider upon receiving a request from the management system instructing the presenting means to provide the time-critical advisory information to the field service provider.

2. A network advisory system as defined in claim 1 further comprising:

means for storing the time-critical advisory information, wherein the presenting means retrieves the time-critical advisory information stored in the storing means and transmits the time-critical advisory information to a requesting entity accessing the network advisory system via a communication device.

3. In a computer network having a server computer operable to communicate with a management system through a network device, a method for providing advisory information to a field service provider, the advisory information generated from collected data being associated with a service being provided at a destination location wherein the collected data is business data associated with a specific customer account for which the service is being provided, the method comprising:

determining whether the collected data identifies a time-critical situation associated with the specific customer account;

when the collected data identifies a time-critical situation, mapping the collected data to time-critical advisory information; responsive to the operation of mapping the collected data to time-critical advisory information, presenting the time-critical advisory information to the management system via the network device;

receiving a request from the management system to present the time-critical advisory information to the field service provider; and presenting the time-critical advisory information to the field service provider.

4. A method as defined in claim 3, wherein the time-critical advisory information is in the form of a script.

5. A method as defined in claim 3, wherein the management system presents the time-critical advisory information to the field service provider.

6. A method as defined in claim 3 further comprises selecting one or more appropriate field service providers to receive the time-critical advisory information and wherein the operation of presenting the time-critical advisory information comprises presenting the time-critical advisory information to each of the one or more field service providers.

7. A computer program product readable by a computing system and encoding a computer program of instructions that, when executed by the computing system, performs a computer process for providing advisory information to a management system in a computer network having an advisory module operable to communicate with the management system through a network device, the management system managing operations of one or more field service providers employed to provide a service, the computer process comprising:

receiving collected data related to the service being provided by the one or more field service providers, wherein the collected data is business data associated with a specific customer account for which the service is being provided;

determining whether the collected data indicates a time-critical situation associated with the specific customer account;

when the collected data indicates a time-critical situation, mapping the data conclusion to time-critical advisory information; and responsive to the operation of mapping the data conclusion to time-critical advisory information, establishing a communication session with the management system, wherein the time-critical advisory information is presented to the management system through the network device during the established communication session;

receiving an instruction from the management system requesting that the time-critical advisory information be provided to a field service provider; and presenting the time-critical advisory information directly to the field service provider.

8. A computer program product as defined in claim 7, wherein the computer process further comprises:

when the collected data is associated with a non time-critical situation, mapping the data conclusion to non time-critical advisory information; and storing the non time-critical advisory information in a storage module.

9. A computer program product as defined in claim 7, wherein the computer process further comprises:

producing a copy of the time-critical advisory information; and storing the copy of the time-critical advisory information in the storage module.

10. A computer program product as defined in claim 7, wherein the operation of determining whether the collected data is associated with a time-critical situation comprises:

analyzing the collected data against an escalation rule to determine whether the collected data satisfies time-critical criterion.

11. In a computer network having an advisory module operable to communicate with a management system through a network device, the management system managing operations of one or more field service providers employed to provide a service, a method for providing advisory information to the management system, the method comprising:

receiving collected data related to the service being provided by the one or more field service providers, wherein the collected data is business data associated with a specific customer account for which the service is being provided;

determining whether the collected data indicates a time-critical situation associated with the specific customer account;

when the collected data indicates a time-critical situation, mapping the data conclusion to time-critical advisory information;

responsive to the operation of mapping the data conclusion to time-critical advisory information, establishing a communication session with the management system, wherein the time-critical advisory information is presented to the management system through the network device during the established communication session;

receiving an instruction from the management system requesting that the time-critical advisory information be provided to a field service provider; and presenting the time-critical advisory information directly to the field service provider.

12. A method as defined in claim 11, further comprising:

when the collected data is associated with a non time-critical situation, mapping the data conclusion to non time-critical advisory information; and storing the non time-critical advisory information in a storage module.

13. A method as defined in claim 12, further comprising:

producing a copy of the time-critical advisory information; and storing the copy of the time-critical advisory information in the storage module.

14. A method as defined in claim 11, wherein the operation of determining whether the collected data is associated with a time-critical situation comprises:

analyzing the collected data against an escalation rule to determine whether the collected data satisfies time-critical criterion.

15. A method as defined in claim 11, wherein the presenting act comprises:

transmitting time-critical advisory information to a network device used by the management system in interacting with the advisory module via the computer network.

16. A method as defined in claim 15, wherein the network device is a computing module and the advisory information is in the form of a script.

17. A method as defined in claim 16, wherein the script is in a form selected from the group consisting of an audio script, a textual script, a binary script and an audio/visual script.

18. A method as defined in claim 17, wherein the management system is a computing system communicating with the advisory module via a computer-based language.

19. A method as defined in claim 17, wherein the management system is a person receiving natural language scripts from the advisory module.

* * * * *